US011665736B2

(12) United States Patent
Zheng et al.

(10) Patent No.: US 11,665,736 B2
(45) Date of Patent: May 30, 2023

(54) CONTROL CHANNEL POSITION DETERMINING METHOD, DEVICE, AND PROCESSOR-READABLE STORAGE MEDIUM

(71) Applicant: Huawei Technologies Co., Ltd., Shenzhen (CN)

(72) Inventors: Juan Zheng, Beijing (CN); Lei Guan, Beijing (CN); Sha Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 238 days.

(21) Appl. No.: 17/013,329

(22) Filed: Sep. 4, 2020

(65) Prior Publication Data

US 2020/0404699 A1 Dec. 24, 2020

Related U.S. Application Data

(63) Continuation of application No. PCT/CN2019/077124, filed on Mar. 6, 2019.

(30) Foreign Application Priority Data

Mar. 6, 2018 (CN) .......................... 201810183089.8

(51) Int. Cl.
*H04W 4/00* (2018.01)
*H04W 74/00* (2009.01)
(Continued)

(52) U.S. Cl.
CPC ......... *H04W 74/002* (2013.01); *H04W 16/14* (2013.01); *H04W 72/20* (2023.01); *H04W 74/08* (2013.01); *H04W 72/0453* (2013.01)

(58) Field of Classification Search
CPC .............. H04W 74/002; H04W 16/14; H04W 72/0406; H04W 74/08; H04W 72/0453;
(Continued)

(56) References Cited

U.S. PATENT DOCUMENTS 10,743,302 B2 * 8/2020 Yang ................... H04W 72/042
2013/0337821 A1 12/2013 Clegg
(Continued)

FOREIGN PATENT DOCUMENTS

CN 106160954 A 11/2016
CN 107026723 A 8/2017
(Continued)

OTHER PUBLICATIONS

Kyocera, "Control Channel Design for LAA Scheduling," 3GPP TSG RAN WG1 Meeting #80bis, Belgrade, Serbia, R1-151467, Total 2 pages, 3rd Generation Partnership Project, Valbonne, France (Apr. 20-24, 2015).
(Continued)

*Primary Examiner* — Thai D Hoang
(74) *Attorney, Agent, or Firm* — Leydig, Voit & Mayer, Ltd.

(57) ABSTRACT

Embodiments of the present invention provide a control channel position determining method, a device, and a processor-readable storage medium. A terminal device determines an available unlicensed band set and a control channel resource group, and determines at least one first unlicensed band to which at least one of control channel resource groups belongs, based on bitmap information or offset information. The at least one first unlicensed band belongs to the available unlicensed band set. Compared with that a control channel resource group is semi-statically configured to belong to a first unlicensed band, according to the embodiments of the present invention, no matter how an available unlicensed band included in an available unlicensed band set changes, a first unlicensed band to which at least one control channel resource group belongs can always be determined, thereby ensuring normal communication.

18 Claims, 9 Drawing Sheets

(51) Int. Cl.
*H04W 16/14* (2009.01)
*H04W 74/08* (2009.01)
*H04W 72/20* (2023.01)
*H04W 72/0453* (2023.01)

(58) Field of Classification Search
CPC .. H04W 74/006; H04L 5/001; H04L 27/0006; H04L 5/0053
See application file for complete search history.

(56) References Cited

U.S. PATENT DOCUMENTS

| | | | |
|---|---|---|---|
| 2016/0135143 A1* | 5/2016 | Won | H04W 12/08 370/312 |
| 2016/0219623 A1 | 7/2016 | Chien | |
| 2016/0227578 A1* | 8/2016 | Lee | H04W 74/004 |
| 2017/0048828 A1 | 2/2017 | Um et al. | |
| 2018/0097609 A1* | 4/2018 | Tiirola | H04W 72/0413 |
| 2018/0103380 A1* | 4/2018 | Ode | H04W 76/15 |
| 2020/0351849 A1* | 11/2020 | Yang | H04L 5/0048 |

FOREIGN PATENT DOCUMENTS

| | | | | |
|---|---|---|---|---|
| CN | 107637006 A | 1/2018 | | |
| CN | 107667565 A | 2/2018 | | |
| EP | 3417558 B1 * | 7/2021 | | H04L 1/1812 |
| WO | 2017164626 A2 | 9/2017 | | |

OTHER PUBLICATIONS

CN/201810183089.8, Office Action, dated Sep. 28, 2022.

\* cited by examiner

CONTROL CHANNEL POSITION DETERMINING METHOD, DEVICE, AND PROCESSOR-READABLE STORAGE MEDIUM

CROSS-REFERENCE TO RELATED APPLICATIONS

This application is a continuation of International Application No. PCT/CN2019/077124, filed on Mar. 6, 2019, which claims priority to Chinese Patent Application No. 201810183089.8, filed on Mar. 6, 2018. The disclosures of the aforementioned applications are hereby incorporated by reference in their entireties.

TECHNICAL FIELD

Embodiments of the present disclosure relate to the communications field, and more specifically, to a control channel position determining method, a device, and a processor-readable storage medium.

BACKGROUND

With rapid development of wireless communications application, users have increasingly high requirements on a capacity and a rate of a wireless network. Especially in hotspot areas (e.g., a superstore and a stadium) in which wireless users are dense, a licensed spectrum can hardly provide high-quality services for all the users simultaneously. In addition, currently, appropriate spectrums around the world are becoming strained to be allocated, and costs of purchasing licensed frequency bands by operators are increasingly expensive. To reduce spectrum costs of the wireless network and relieve service pressure on the licensed frequency bands, a long term evolution (LTE) communications system in an unlicensed spectrum is designed in a wireless communications network.

In a future 5th generation (5G) communications system, data communication may alternatively be performed by using an unlicensed spectrum resource in a new radio (NR) based communications system.

The unlicensed spectrum is shared. Therefore, to reduce or avoid a conflict in the unlicensed spectrum, a listen before talk (LBT) technology becomes a common coexistence mechanism for communication using the unlicensed spectrum. An occupation right of a channel in an unlicensed frequency band is obtained by using an LBT mechanism. A terminal device/network device that obtains the channel occupation right may send data within a period of time, but a data sending time length cannot exceed a maximum channel occupancy time (MCOT).

In LTE communications systems, a licensed assisted access (LAA) system is an LTE system in which data communication is performed by using the unlicensed spectrum through carrier aggregation. In the LAA system, the occupation right of the channel in the unlicensed frequency band is obtained by using an LBT preemption mechanism. In a process of performing communication through LAA, an access network device first configures one or more unlicensed frequency bands (alternatively referred to as carriers or cells) for a terminal device, and the one or more unlicensed frequency bands are used as secondary frequency bands. The access network device may configure a control channel resource for the one or more unlicensed frequency bands. Then, the access network device obtains an available frequency band (also referred to as an idle frequency band or a frequency band with a transmission opportunity) based on an LBT listening result. The access network device sends downlink control information to the terminal device by using a control channel resource in the available unlicensed frequency band for which the control channel resource is configured, and sends downlink data by using the available unlicensed frequency band. However, when an unlicensed frequency band for which a control channel resource is configured is unavailable, the network device cannot communicate with the terminal device by using another available unlicensed band.

SUMMARY

Embodiments of the present disclosure provide a control channel position determining method, a device, and a processor-readable storage medium, so that a network device can communicate with a terminal device by using an unlicensed band.

According to a first aspect, a control channel position determining method is provided. The method includes: determining an unlicensed band set, where the unlicensed band set includes A unlicensed bands; determining an available unlicensed band set, where the available unlicensed band set includes B unlicensed bands, and the available unlicensed band set is a subset of the unlicensed band set; and determining C first unlicensed bands in the available unlicensed band set, where the first unlicensed band includes a control channel, and A, B and C are all positive integers.

In a possible design, the method further includes: sending first indication information to a terminal device by using a licensed band, where the first indication information is used to indicate the determined C first unlicensed bands; sending first indication information to a terminal device by using at least one unlicensed band in the available unlicensed band set, where the first indication information is used to indicate the determined C first unlicensed bands; or sending first indication information to a terminal device by using at least one of the determined C first unlicensed bands, where the first indication information is used to indicate the determined C first unlicensed bands.

In a possible design, the method further includes: sending second indication information to the terminal device, where the second indication information is used to indicate D control channel resource groups, each of the control channel resource groups includes one or more control channel resource sets, and D is a positive integer. The determining C first unlicensed bands in the available unlicensed band set includes: determining, in the available unlicensed band set, a control channel resource group included in each of the C first unlicensed bands, where an $i^{th}$ control channel resource group belongs to an $i^{th}$ first unlicensed band, and $1 \le i \le C$; or a $j^{th}$ control channel resource group belongs to a $(((j-1) \bmod C)+1)^{th}$ first unlicensed band, and $1 \le j \le D$.

In a possible design, the method further includes: sending third indication information to the terminal device, where the third indication information is used to indicate at least one offset m, and m is a natural number. The determined C first unlicensed bands include an $((m+1) \bmod B)^{th}$ unlicensed band in the available unlicensed band set, and the $((m \bmod B)+1)^{th}$ unlicensed band is an $((m \bmod B)+1)^{th}$ unlicensed band in the B unlicensed bands in ascending order of frequencies or sequence numbers; or the $((m \bmod B)+1)^{th}$ unlicensed band is an $((m \bmod B)+1)^{th}$ unlicensed band in the B unlicensed bands in descending order of frequencies or sequence numbers.

In a possible design, the method further includes: sending second indication information to the terminal device, where the second indication information is used to indicate D control channel resource groups, and each of the control channel resource groups includes one or more control channel resource sets, where when D<B, the determined C first unlicensed bands include D unlicensed bands in the available unlicensed band set; and/or when D≥B, the determined C first unlicensed bands include the B unlicensed bands in the available unlicensed band set. A $j^{th}$ control channel resource group belongs to a $(((j+m-1) \bmod B)+1)^{th}$ available unlicensed band, and 1≤j≤D. The first to a $D^{th}$ control channel resource groups are in ascending order of sequence numbers or priorities; or the first to a $D^{th}$ control channel resource groups are in descending order of sequence numbers or priorities.

According to a second aspect, a control channel position determining method is provided. The method includes: determining an unlicensed band set, where the unlicensed band set includes A unlicensed bands; determining an available unlicensed band set, where the available unlicensed band set includes B unlicensed bands, and the available unlicensed band set is a subset of the unlicensed band set; and determining C first unlicensed bands in the available unlicensed band set, where the first unlicensed band includes a control channel, and A, B and C are all positive integers.

In a possible design, before the determining C first unlicensed bands in the available unlicensed band set, the method further includes: receiving, by using a licensed band, first indication information sent by a network device, where the first indication information is used to indicate the determined C first unlicensed bands; receiving, by using at least one unlicensed band in the available unlicensed band set, first indication information sent by a network device, where the first indication information is used to indicate the determined C first unlicensed bands; or receiving, at a terminal device by using at least one of the determined C first unlicensed bands, first indication information sent by a network device, where the first indication information is used to indicate the determined C first unlicensed bands.

In a possible design, the method further includes: receiving second indication information sent by the network device, where the second indication information is used to indicate D control channel resource groups, each of the control channel resource groups includes one or more control channel resource sets, and D is a positive integer. The determining C first unlicensed bands in the available unlicensed band set includes: determining, in the available unlicensed band set, a control channel resource group included in each of the C first unlicensed bands, where an $i^{th}$ control channel resource group belongs to an $i^{th}$ first unlicensed band, and 1≤i≤C; or a $j^{th}$ control channel resource group belongs to a $(((j-1) \bmod C)+1)^{th}$ first unlicensed band, and 1≤j≤D.

In a possible design, the method further includes: receiving third indication information sent by the network device, where the third indication information is used to indicate at least one offset m, and m is a natural number. The determined C first unlicensed bands include an $((m \bmod B)+1)^{th}$ unlicensed band in the available unlicensed band set, where the $((m \bmod B)+1)^{th}$ unlicensed band is an $((m \bmod B)+1)^{th}$ unlicensed band in the B unlicensed bands in ascending order of frequencies or sequence numbers; or the $((m \bmod B)+1)^{th}$ unlicensed band is an $((m \bmod B)+1)^{th}$ unlicensed band in the B unlicensed bands in descending order of frequencies or sequence numbers.

In a possible design, the method further includes: receiving second indication information sent by the network device, where the second indication information is used to indicate D control channel resource groups, and each of the control channel resource groups includes one or more control channel resource sets, where when D<B, the determined C first unlicensed bands include D unlicensed bands in the available unlicensed band set; and/or when D≥B, the determined C first unlicensed bands include the B unlicensed bands in the available unlicensed band set. A $j^{th}$ control channel resource group belongs to a $(((j+m-1) \bmod B)+)^{th}$ available unlicensed band, and 1≤j≤D. The first to a $D^{th}$ control channel resource groups are in ascending order of sequence numbers or priorities; or the first to a $D^{th}$ control channel resource groups are in descending order of sequence numbers or priorities.

According to a third aspect, a wireless communications apparatus is provided. The wireless communications apparatus includes a processor, where the processor is configured to determine an unlicensed band set, and the unlicensed band set includes A unlicensed bands; the processor is further configured to determine an available unlicensed band set, where the available unlicensed band set includes B unlicensed bands, and the available unlicensed band set is a subset of the unlicensed band set; and the processor is further configured to determine C first unlicensed bands in the available unlicensed band set, where the first unlicensed band includes a control channel, and A, B and C are all positive integers.

In a possible design, the wireless communications apparatus further includes a transceiver coupled to the processor, where the transceiver is configured to send first indication information to a terminal device by using a licensed band, where the first indication information is used to indicate the determined C first unlicensed bands; the transceiver is configured to send first indication information to a terminal device by using at least one unlicensed band in the available unlicensed band set, where the first indication information is used to indicate the determined C first unlicensed bands; or the transceiver is configured to send first indication information to a terminal device by using at least one of the determined C first unlicensed bands, where the first indication information is used to indicate the determined C first unlicensed bands.

In a possible design, the wireless communications apparatus further includes: the transceiver is configured to send second indication information to the terminal device, where the second indication information is used to indicate D control channel resource groups, each of the control channel resource groups includes one or more control channel resource sets, and D is a positive integer. That the processor is configured to determine the C first unlicensed bands in the available unlicensed band set includes: determining, in the available unlicensed band set, a control channel resource group included in each of the C first unlicensed bands, where an $i^{th}$ control channel resource group belongs to an $i^{th}$ first unlicensed band, and 1≤i≤C; or a $j^{th}$ control channel resource group belongs to a $(((j-1) \bmod C)+1)^{th}$ first unlicensed band, and 1≤j≤D.

In a possible design, the wireless communications apparatus further includes: the transceiver is configured to send third indication information to the terminal device, where the third indication information is used to indicate at least one offset m, and m is a natural number. The determined C first unlicensed bands include an $((m+1) \bmod B)^{th}$ unlicensed band in the available unlicensed band set, and the ((m mod B)+1)$^{th}$ unlicensed band is an ((m mod B)+1)$^{th}$ unlicensed band in the B unlicensed bands in ascending order of frequencies or sequence numbers; or the ((m mod B)+1)$^{th}$ unlicensed band is an ((m mod B)+1)$^{th}$ unlicensed band in the B unlicensed bands in descending order of frequencies or sequence numbers.

In a possible design, the wireless communications apparatus further includes: the transceiver is configured to send second indication information to the terminal device, where the second indication information is used to indicate D control channel resource groups, and each of the control channel resource groups includes one or more control channel resource sets, where when D<B, the determined C first unlicensed bands include D unlicensed bands in the available unlicensed band set; and/or when D≥B, the determined C first unlicensed bands include the B unlicensed bands in the available unlicensed band set. A j$^{th}$ control channel resource group belongs to a (((j+m−1) mod B)+1)$^{th}$ available unlicensed band, and 1≤j≤D. The first to a D$^{th}$ control channel resource groups are in ascending order of sequence numbers or priorities; or the first to a D$^{th}$ control channel resource groups are in descending order of sequence numbers or priorities.

According to a fourth aspect, a wireless communications apparatus is provided. The wireless communications apparatus includes a processor, where the processor is configured to determine an unlicensed band set, and the unlicensed band set includes A unlicensed bands; the processor is further configured to determine an available unlicensed band set, where the available unlicensed band set includes B unlicensed bands, and the available unlicensed band set is a subset of the unlicensed band set; and the processor is further configured to determine C first unlicensed bands in the available unlicensed band set, where the first unlicensed band includes a control channel, and A, B and C are all positive integers.

In a possible design, the wireless communications apparatus further includes a transceiver coupled to the processor, and before the C first unlicensed bands is determined in the available unlicensed band set, the transceiver is configured to receive, at a terminal device by using a licensed band, first indication information sent by a network device, where the first indication information is used to indicate the determined C first unlicensed bands; the transceiver is configured to receive, at a terminal device by using at least one unlicensed band in the available unlicensed band set, first indication information sent by a network device, where the first indication information is used to indicate the determined C first unlicensed bands; or the transceiver is configured to receive, at a terminal device by using at least one of the determined C first unlicensed bands, first indication information sent by a network device, where the first indication information is used to indicate the determined C first unlicensed bands.

In a possible design, the wireless communications apparatus further includes: the transceiver is configured to receive second indication information sent by the network device, where the second indication information is used to indicate D control channel resource groups, each of the control channel resource groups includes one or more control channel resource sets, and D is a positive integer. That the processor is configured to determine the C first unlicensed bands in the available unlicensed band set includes: determining, in the available unlicensed band set, a control channel resource group included in each of the C first unlicensed bands, where an i$^{th}$ control channel resource group belongs to an i$^{th}$ first unlicensed band, and 1≤i≤C; or j$^{th}$ control channel resource group belongs to a (((j−1) mod C)+1)$^{th}$ first unlicensed band, and 1≤j≤D.

In a possible design, the wireless communications apparatus further includes: the transceiver is configured to receive third indication information sent by the network device, where the third indication information is used to indicate at least one offset m, and m is a natural number. The determined C first unlicensed bands include an ((m mod B)+1)$^{th}$ unlicensed band in the available unlicensed band set, where the ((m mod B)+1)$^{th}$ unlicensed band is an ((m mod B)+1)$^{th}$ unlicensed band in the B unlicensed bands in ascending order of frequencies or sequence numbers; or the ((m mod B)+1)$^{th}$ unlicensed band is an ((m mod B)+1)$^{th}$ unlicensed band in the B unlicensed bands in descending order of frequencies or sequence numbers.

In a possible design, the wireless communications apparatus further includes: the transceiver is configured to receive second indication information sent by the network device, where the second indication information is used to indicate D control channel resource groups, and each of the control channel resource groups includes one or more control channel resource sets, where when D<B, the determined C first unlicensed bands include D unlicensed bands in the available unlicensed band set; and/or when D≥B, the determined C first unlicensed bands include the B unlicensed bands in the available unlicensed band set. A j$^{th}$ control channel resource group belongs to a (((j+m−1) mod B)+1)$^{th}$ available unlicensed band, and 1≤j≤D. The first to a D$^{th}$ control channel resource groups are in ascending order of sequence numbers or priorities; or the first to a D$^{th}$ control channel resource groups are in descending order of sequence numbers or priorities.

In a possible design, the first indication information in the foregoing aspects is a bitmap, the bitmap includes A bits, the A bits in the bitmap correspond to the A unlicensed bands, and a value of each of the A bits is used to indicate whether a corresponding unlicensed band is the first unlicensed band; the first indication information in the foregoing aspects is a bitmap, the bitmap includes B bits, the B bits in the bitmap correspond to the B available unlicensed bands, and a value of each of the B bits is used to indicate whether a corresponding unlicensed band is the first unlicensed band; the first indication information in the foregoing aspects is a bitmap, the bitmap includes A-1 bits, the A-1 bits in the bitmap correspond to A-1 unlicensed bands, the A-1 unlicensed bands are unlicensed bands that are other than a first unlicensed band for sending the first indication information and that are in the A unlicensed bands, and a value of each of the A-1 bits is used to indicate whether a corresponding unlicensed band is the first unlicensed band; or the first indication information in the foregoing aspects is a bitmap, the bitmap includes B-1 bits, the B-1 bits in the bitmap correspond to B-1 available unlicensed bands, the B-1 available unlicensed bands are available unlicensed bands that are other than a first unlicensed band for sending the first indication information and that are in the B available unlicensed bands, and a value of each of the B-1 bits is used to indicate whether a corresponding unlicensed band is the first unlicensed band.

In a possible design, the first to a D$^{th}$ control channel resource groups in the foregoing aspects are in ascending order of sequence numbers or priorities; or the first to a D$^{th}$ control channel resource groups in the foregoing aspects are in descending order of sequence numbers or priorities.

In a possible design, the first to a C$^{th}$ first unlicensed bands in the foregoing aspects are in ascending order of frequencies or sequence numbers; the first to a C$^{th}$ first unlicensed bands in the foregoing aspects are in descending order of frequencies or sequence numbers; the first to a $C^{th}$ first unlicensed bands in the foregoing aspects are in order from an unlicensed band corresponding to a most significant bit in the bitmap to an unlicensed band corresponding to a least significant bit in the bitmap; or the first to a $C^{th}$ first unlicensed bands in the foregoing aspects are in order from an unlicensed band corresponding to a least significant bit in the bitmap to an unlicensed band corresponding to a most significant bit in the bitmap.

According to a fifth aspect, a processor-readable storage medium is provided. The processor-readable storage medium includes an instruction. When the instruction is run on a processor, the processor is enabled to perform the method according to any one of the foregoing aspects.

According to a sixth aspect, a wireless communications apparatus is provided. The wireless communications apparatus includes a processor and a memory connected to the processor. The memory is configured to store an instruction, and the processor is configured to read and execute the instruction stored in the memory, so that the communications apparatus performs the method according to any one of the foregoing aspects.

DESCRIPTION OF EMBODIMENTS

The following clearly and completely describes the technical solutions in embodiments of the present disclosure with reference to the accompanying drawings in the embodiments of the present disclosure.

For ease of understanding, the following describes some concepts in the embodiments of the present disclosure.

A band occupies a width in frequency domain. That is, one band occupies one segment of spectrum. For example, a center frequency of a band is 1800 megahertz, and a width of the band is 20 megahertz. Specifically, the band may be a frequency band, a sub-band, a carrier, a cell, or a bandwidth part (BWP).

An unlicensed band occupies a segment of unlicensed spectrum. Specifically, the unlicensed band may be an unlicensed frequency band, an unlicensed carrier, an unlicensed cell, an unlicensed sub-band, or an unlicensed BWP.

Correspondingly, an available unlicensed band may also be referred to as an idle unlicensed or an unlicensed band with a transmission opportunity. Usually, whether an unlicensed band is available is determined by detecting energy or signal strength. Specifically, for example, if received energy or signal strength in an unlicensed band is less than or equal to a preconfigured threshold, the unlicensed band is an available unlicensed band.

The secondary band is a band used to transmit data and/or control signaling when communication is performed through, for example, carrier aggregation, dual connection, or multi-connection, and corresponds to a primary band. Specifically, the secondary band may be a secondary carrier, a secondary frequency band, a secondary cell, a secondary sub-band, or a secondary BWP.

Figure 1:
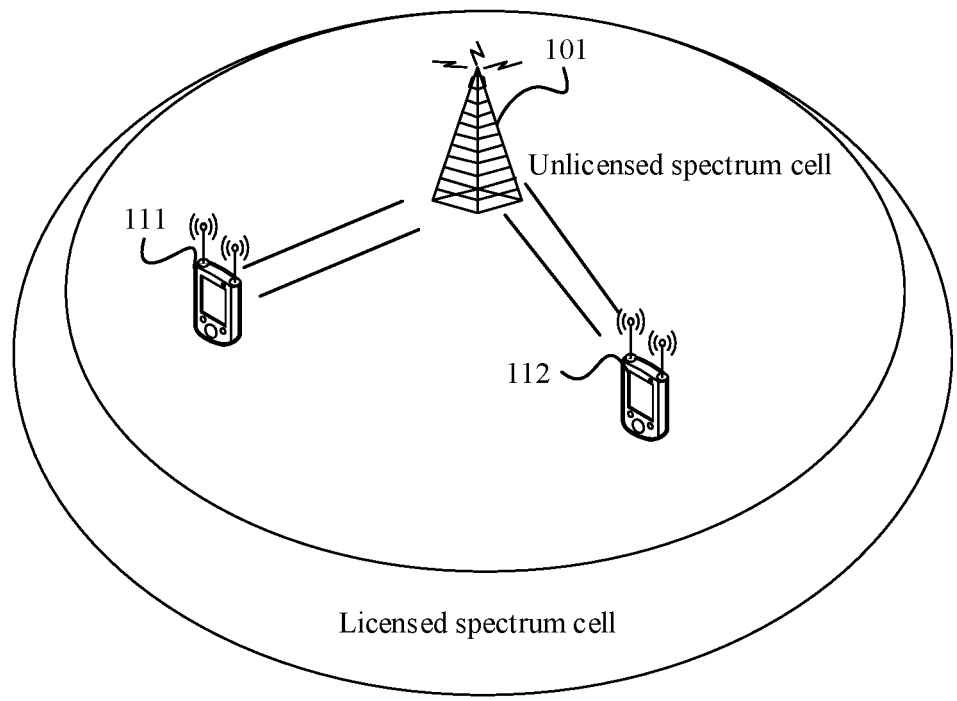
FIG. 1 is a schematic diagram of a wireless communications system applied to an embodiment of the present disclosure.

FIG. 1 shows an example of a communications system to which the present disclosure is applicable. The communications system includes a network device 101 and terminal devices 111 and 112 located within coverage of the network device 101 and communicating with the network device 101. For simplicity, FIG. 1 shows only two terminal devices. However, it does not mean that there can be only two terminal devices. Actually, there may be any quantity of terminal devices. It should be understood that, the present disclosure is applicable to wireless cellular communications network systems in which communication is performed by using an unlicensed spectrum, for example, a licensed assisted access (LAA) system, an enhanced licensed assisted access (eLAA) system, and a further enhanced licensed assisted access (FeLAA) system that are in long term evolution (LTE), a 5G communications system and a future communications system in which the unlicensed spectrum is used, and a MulteFire system that independently works in the unlicensed spectrum. The LTE-LAA system is used as an example in the embodiments of the present disclosure, and does not constitute a limitation on the technical solutions provided in the embodiments of the present disclosure. A person of ordinary skill in the art may know that with evolution of a network architecture and emergence of a new service scenario, the technical solutions provided in the embodiments of the present disclosure are also applicable to similar technical problems.

It should be understood that, in the embodiments of the present disclosure, a network device (e.g., the network device 101) is an apparatus that is deployed in a radio access network and that is configured to provide a wireless communication function for a terminal device. The network device may include radio access network devices, macro base stations, micro base stations (also referred to as small cells), relay stations, access points, and the like in various forms. The network device may be a base transceiver station (BTS) in GSM or CDMA, may be a NodeB (NB) in WCDMA, may be an evolved NodeB (eNB or eNodeB) in LTE or eLTE, or may be a gNB ((next) generation NodeB) in a next generation mobile network, for example, 5G (fifth generation), a road side unit (RSU) in V2X communication, or a chip inside the foregoing network device or the foregoing base station or a system on a chip (SOC) inside the foregoing network device or the foregoing base station. For ease of description, in this application, these network devices are referred to as network devices or access network devices for short, and are sometimes referred to as base stations.

It should be further understood that, in the embodiments of the present disclosure, a terminal device may also be referred to as user equipment (UE), a mobile station (MS), a mobile terminal, or the like. The terminal device may communicate with one or more core networks over a radio access network (RAN). For example, the terminal device is device having a wireless transceiver function, and may be deployed on land, where the deployment includes indoor or outdoor, or handheld or vehicle-mounted deployment, may be deployed on wafer (e.g., on a ship), or may be deployed in air (e.g., on an aircraft, a balloon, and a satellite). The terminal device may be a mobile phone, a tablet, a computer having a wireless transceiver function, a virtual reality (VR) terminal device, an augmented reality (AR) terminal device, a wireless terminal in industrial control (industrial control), a wireless terminal in self driving, a wireless terminal in a telemedicine (remote medical), a wireless terminal in a smart grid, a wireless terminal in transportation safety, a wireless terminal in a smart city, a wireless terminal in a smart home, and the like. For ease of description, in this application, the terminal device is referred to as a terminal device or UE for short.

In this embodiment of the present disclosure, the network device 101 and the terminal devices 111 and 112 may perform data communication in the unlicensed spectrum. In this scenario, the LAA, eLAA, and FeLAA systems in LTE systems, the 5G communications system or the future communications system in which the unlicensed spectrum (e.g., 5150 MHz to 5350 MHz) is used, a system, for example, the MulteFire system, independently working in the unlicensed spectrum, and the like may be used. In the network structure shown in FIG. 1, there is a primary cell working in a licensed spectrum and a secondary cell working in the unlicensed spectrum in the coverage of the network device 101. The network device 101 in the primary cell and the network device 101 in the secondary cell may correspond to a same physical site or two different physical sites (e.g., a macro base station and a micro base station). Different sites may communicate with each other. The terminal devices 111 and 112 use an unlicensed frequency band by accessing the secondary cell. The terminal devices 111 and 112 may be (1) terminal devices that have data to be sent; (2) terminal devices that need to retransmit data; (3) idle terminal devices that have no uplink data; and the like.

Figure 2:
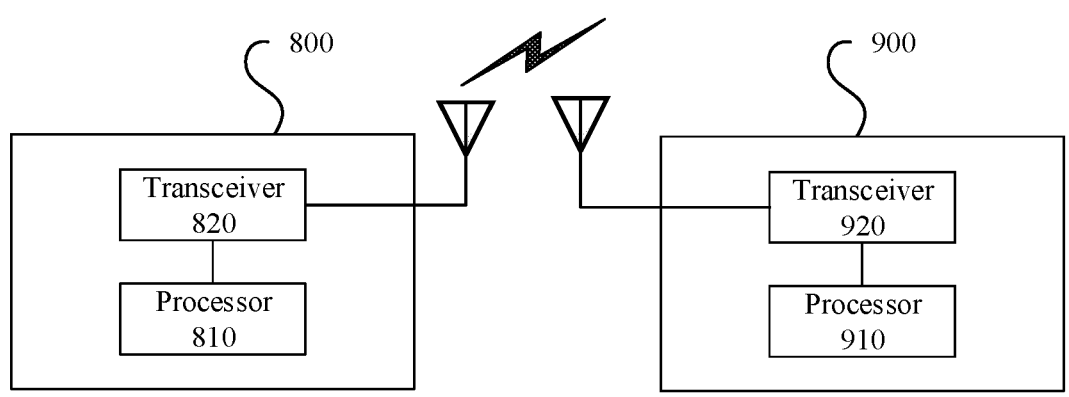
FIG. 2 is a possible schematic structural diagram of a network device and a terminal device in the foregoing wireless communications system.

FIG. 2 is a schematic block diagram of a wireless apparatus 800 and a wireless apparatus 900 according to an embodiment of the present disclosure. The wireless apparatus 800 and the wireless apparatus 900 may be configured to implement methods in the embodiments of the present disclosure. The wireless apparatus 800 may be the network device 101 in FIG. 1, or may be a component of the network device 101 that implements a communication function. The wireless apparatus 900 may be the terminal device 111 or 112 in FIG. 1, or may be a component of the terminal device 111 or 112 that implement the communication function.

The wireless apparatus 800 includes a processor 810 and the wireless apparatus 900 includes a processor 910. The processor 810 is configured to generate a baseband signal that carries to-be-sent information, and process a received baseband signal. The wireless apparatus 800 may further include a transceiver 820 connected to the processor 810 through a line, and the wireless apparatus 900 may further include a transceiver 920 connected to the processor 910 through a line. The transceivers 820 and 920 are configured to process baseband signals generated by the processors 810 and 910 to convert the baseband signals into radio frequency signals, and process radio frequency signals received by using antennas to convert the radio frequency signals into baseband signals that can be processed by the processors. For example, when the wireless apparatus 800 is the network device 101, the wireless apparatus 800 may include the processor 810 and the transceiver 820. When the wireless apparatus 900 is the terminal device 111 or 112, the wireless apparatus 900 may include the processor 910 and the transceiver 920.

Figure 3A:
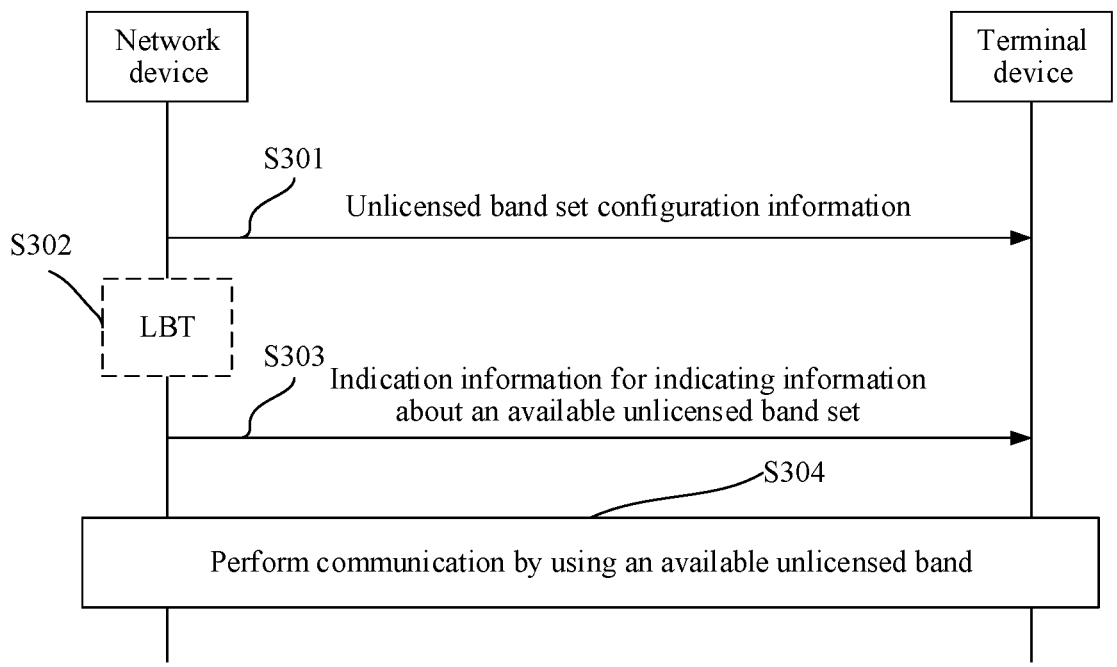
FIG. 3a is a schematic diagram of a control channel position determining procedure.
Figure 3B:
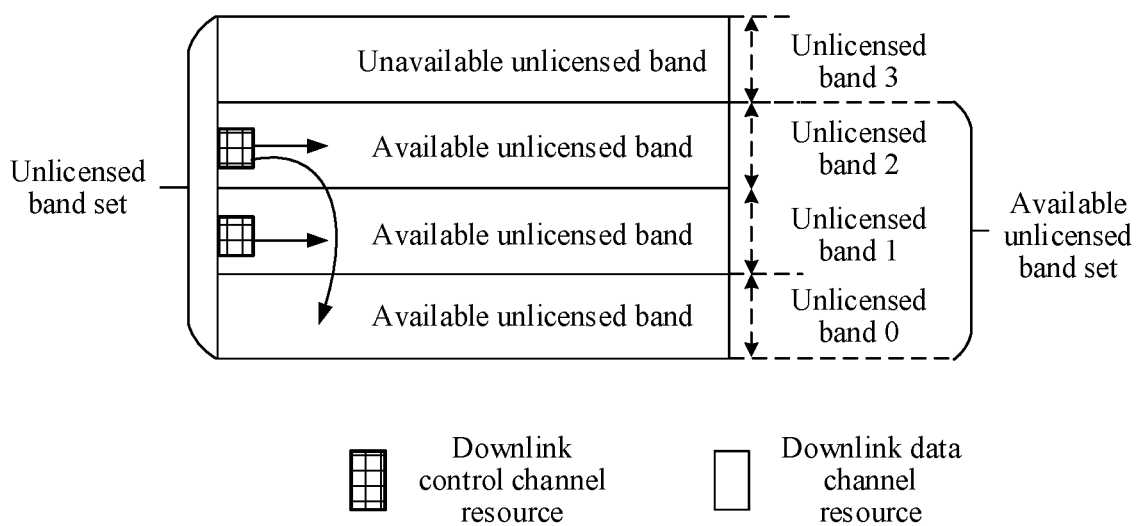
FIG. 3b is a possible schematic diagram in which a control channel resource is fixed in an unlicensed band in an LAA system.

FIG. 3a is a schematic diagram of a control channel position determining method. A network device may be the network device 101 in FIG. 1. A terminal device may be one of the terminal devices 111 and 112 in FIG. 1.

S301: The network device sends unlicensed band set configuration information to the terminal device. Correspondingly, the terminal device receives the unlicensed band set configuration information. An unlicensed band set includes at least one unlicensed band. All unlicensed bands in the unlicensed band set are configured as a secondary band of the terminal device by using the unlicensed band set configuration information.

The unlicensed band set configuration information may include one or more of the following information:

an index of each unlicensed band in the unlicensed band set;

a center frequency of the unlicensed band in the unlicensed band set; and an identifier of the unlicensed band in the unlicensed band set, for example, a physical cell identifier (PCI).

The unlicensed band may carry a control channel resource. To reduce control channel resource overheads, some unlicensed bands may not carry a control channel resource. To be specific, to reduce the control channel resource overheads, some unlicensed bands in the unlicensed band set carry control channel resources, and the other unlicensed bands do not carry a control channel resource.

When one or more unlicensed bands in the unlicensed band set need to carry a control channel resource, the unlicensed band set configuration information may further include control channel resource configuration information of the one or more unlicensed bands that carry the control channel resource. The control channel resource is used to transmit uplink or downlink control signaling. For example, the control channel resource configuration information may be control channel resource configuration information corresponding to an enhanced physical downlink control channel (EPDCCH). Alternatively, the control channel resource configuration information may be control channel resource configuration information corresponding to a control-resource set (CORSET). For example, as shown in FIG. 3a, the control channel resource configuration information is used to configure control channel resources carried in unlicensed bands 1 and 2 in an unlicensed band set.

When the downlink control signaling is scheduling information, the downlink control signaling may be used to indicate a data resource in an unlicensed band that carries the downlink control signaling, or may be used to indicate a data resource in another unlicensed band, that is, cross scheduling. For example, as shown in FIG. 3a, downlink control information (e.g., scheduling information) transmitted on a control channel resource in the unlicensed band 1 may be used to indicate a data resource in the unlicensed band 1. Downlink control information (e.g., scheduling information) transmitted on a control channel resource in the unlicensed band 2 (e.g., Index=2) may be used to indicate a data resource in the unlicensed band 2, or may be used to indicate a data resource in an unlicensed band 0 (that is, cross scheduling).

It should be noted that, in the embodiments of the present disclosure, an unlicensed band i may represent that a sequence number (or an index or an identifier) of the unlicensed band is i. For example, the unlicensed band 1 represents an unlicensed band whose sequence number (or index or identifier) is 1. For ease of description, the following provides descriptions in a form of the unlicensed band i.

S302: The network device listens to the unlicensed band in the unlicensed band set, to be specific, performs an LBT operation in a configured unlicensed band.

For example, as shown in FIG. 3a, it is assumed that the unlicensed band set includes four unlicensed bands: the unlicensed band 0 to an unlicensed band 3. The network device performs the LBT operation in the unlicensed bands 0, 1, 2, and 3. When listening to and obtaining that at least one unlicensed band is available (e.g., the unlicensed bands 0, 1, and 2 are available), the network device determines that a part (e.g., the unlicensed bands 0 and 2) or all (e.g., the unlicensed bands 0, 1, and 2) of the at least one unlicensed band is an available unlicensed band set. The network device sends and/or receives control signaling and/or data by using at least one unlicensed band in the available unlicensed band set.

S303: The network device sends the indication information to the terminal device, where the indication information is used to indicate information about an available unlicensed band set. Correspondingly, the terminal device receives the indication information.

Specifically, the network device obtains the available unlicensed band set through LBT, and then sends the information about the available unlicensed band set to the terminal device. For example, the network device listens to and obtains that the unlicensed bands 0, 1, and 2 are available. To be specific, the available unlicensed band set obtained by the network device is the unlicensed bands 0, 1, and 2. The network device notifies the terminal device of the unlicensed bands 0, 1, and 2 by using the indication information.

In an implementation (e.g., a manner 1), the indication information may be a reference signal, and the terminal may obtain the available unlicensed band set based on the reference signal. Specifically, the terminal device may perform blind detection on whether there is the reference signal in each unlicensed band in an unlicensed band set, to determine whether the unlicensed band is available. If the reference signal is detected in an unlicensed band, it indicates that the unlicensed band is available. The reference signal may be a cell-common reference signal or a terminal device-specific reference signal. This is not specifically limited. In another implementation (e.g., a manner 2), the indication information may be physical layer control information (for example, downlink control information (DCI)) transmitted in each unlicensed band that carries a control channel resource and that is in an unlicensed band set. The terminal device may perform blind detection on whether there is the physical layer control information in the unlicensed band that carries the control channel resource and that is in the unlicensed band set, to determine whether the unlicensed band is available. That is, in the manner 2, to determine whether the unlicensed band is available, the terminal device only needs to perform blind detection on whether there is the physical layer control information in the unlicensed band that carries the control channel resource and that is in the unlicensed band set, and does not need to determine, based on content of the physical layer control information, whether the unlicensed band is available. In another implementation (e.g., a manner 3), the indication information may alternatively be control information transmitted on a licensed band or an available unlicensed band. The control information may be physical layer control information or higher layer control information. After receiving the control information, the terminal device determines the available unlicensed band set based on content in the control information. To be specific, in the manner 3, the terminal device determines the available unlicensed band set by using the content (e.g., the control information explicitly indicates that unlicensed bands 0, 1, and 2 are available) included in the control information.

S304: The network device communicates with the terminal device by using at least one unlicensed band in the available unlicensed band set.

For example, as shown in FIG. 3a, the network device may send control information (e.g., scheduling information) on a control channel resource in the unlicensed band 2. The control information is used to indicate the terminal device to receive or send data in the unlicensed band 2. Correspondingly, the terminal device receives the control information on the control channel resource in the unlicensed band 2, and receives or sends the data in the unlicensed band 2 based on the control information. The network device may alternatively send control information (e.g., scheduling information) on a control channel resource in the unlicensed band 2. The control information is used to indicate the terminal device to receive or send data in the unlicensed band 0. Correspondingly, the terminal device receives the control information on the control channel resource in the unlicensed band 2, and receives or sends the data in the unlicensed band 0 based on the control information.

For another example, the network device may send control information (e.g., scheduling information) on a control channel resource in the unlicensed band 2. The control information is used to indicate the terminal device to receive or send data in the unlicensed band 2 and another available unlicensed band. Correspondingly, the terminal device receives the control information on the control channel resource in the unlicensed band 2, and receives or sends the data in the unlicensed band 2 and the another available unlicensed band based on the control information. The data may be jointly transmitted in the unlicensed band 2 and the another available unlicensed band. For example, assuming that available unlicensed bands are unlicensed bands 0, 1, and 2, time-frequency resources used to transmit a data transport block (TB) may be distributed on all of the unlicensed band 0, the unlicensed band 1, and the unliband 2 (which may be considered as a transmission manner of wideband data transmission).

Figure 3C:
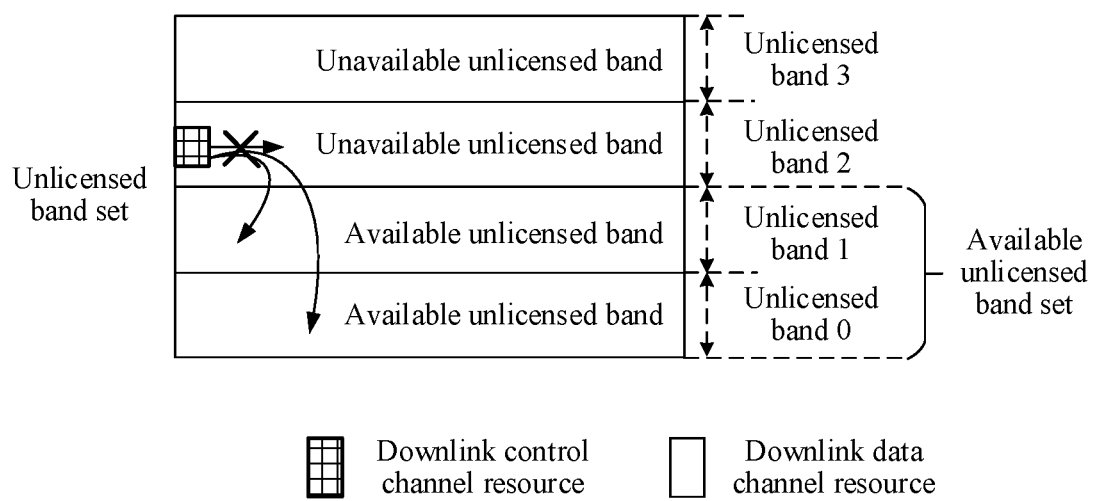
FIG. 3c is another possible schematic diagram in which a control channel resource is fixed in an unlicensed band in an LAA system.

A problem of the method shown in FIG. 3a is that when an unlicensed band that carries a control channel resource is unavailable, even though another unlicensed band is available, the network device cannot communicate with the terminal device by using the available unlicensed band. In other words, when the available unlicensed band set does not include the unlicensed band that carries the control channel resource, the network device and the terminal device still cannot communicate with each other by using the available unlicensed band. As shown in FIG. 3c, an unlicensed band 2 carries a control channel resource. An available unlicensed band set includes unlicensed bands 0 and 1. In this case, the network device cannot send control information (e.g., scheduling information) by using the control channel resource in the unlicensed band 2. Therefore, the network device cannot schedule data resources in the unlicensed bands 0 and 1.

On one hand, data transmission is affected. On the other hand, data resources in available unlicensed bands are not fully used.

Figure 4A:
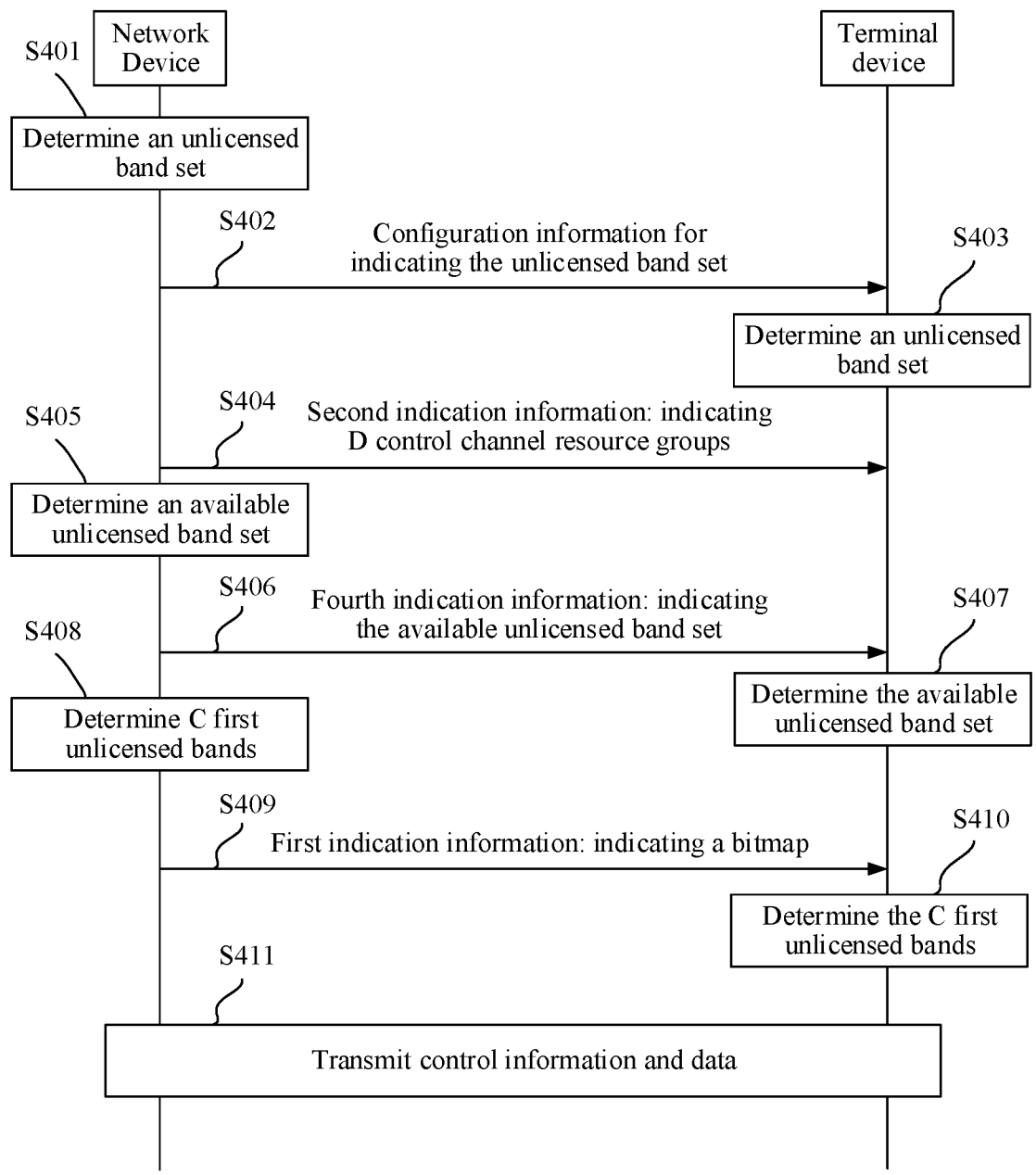
FIG. 4a is a schematic diagram of a control channel position determining procedure according to an embodiment of the present disclosure.

FIG. 4a provides another control channel position determining method according to an embodiment of the present disclosure. A network device in this embodiment may be the network device 101 in FIG. 1, and the terminal device may be either of the terminal devices 111 and 112.

S401: The network device determines an unlicensed band set.

The unlicensed band set includes A unlicensed bands, and A is a positive integer.

It should be noted that, in this embodiment of the present disclosure, the A unlicensed bands included in the unlicensed band set may be unlicensed bands in which the network device can simultaneously work, or may be unlicensed bands configured by the network device for the terminal device. A quantity of the unlicensed bands configured for the terminal device is not greater than a quantity of the unlicensed bands in which the network device can simultaneously work. For example, it is assumed that the quantity of the unlicensed bands in which the network device can simultaneously work is X. In an implementation, the network device may configure all the X unlicensed bands for the terminal device. That is, A=X. In another manner, the network device may configure only A of the X unlicensed bands for the terminal device. That is, A<X.

In an implementation, the processor 810 in the network device 101 may be configured to determine the unlicensed band set.

S402: The network device sends, to the terminal device, configuration information for indicating the unlicensed band set. Correspondingly, the terminal device receives the configuration information that is sent by the network device and that is for indicating the unlicensed band set.

The configuration information for indicating the unlicensed band set includes at least one of the following information:

information for indicating sequence numbers or indexes (Index) of the A unlicensed bands;

information for indicating identifiers of the A unlicensed bands, for example, physical cell identifiers (PCI);

information for indicating frequencies of the A unlicensed bands, where for example, the frequency information may be a center frequency;

information for indicating bandwidths of the A unlicensed bands, for example, a bandwidth value of each unlicensed band, for example, 10 MHz or 20 MHz;

information for indicating a quantity of the unlicensed bands included in the unlicensed band set, where for example, the set includes the A unlicensed bands;

information for indicating a bandwidth of the unlicensed band set, for example, a total bandwidth of the set; and information for indicating priorities of the A unlicensed bands, where for example, priorities are 0, 1, 2, and the like, and the priority information is used in subsequent step S410 and/or step S510 to determine an unlicensed band to which a control channel resource group belongs.

The configuration information for indicating the unlicensed band set may be sent by using a radio resource control (RRC) layer, a media access control (MAC) layer, or a physical layer. This is not limited in the present disclosure. When the configuration information for indicating the unlicensed band set is sent by using the RRC layer, the configuration information for indicating the unlicensed band set may be a dedicated RRC message or a system broadcast message.

It should be noted that, the configuration information for indicating the unlicensed band set may be sent on a licensed band. Alternatively, the configuration information for indicating the unlicensed band set may be sent on any unlicensed band in which the configuration information for indicating the unlicensed band set can be transmitted. For example, if the terminal device and the network device can transmit control information and data by using an unlicensed band (e.g., an unlicensed band 0) by executing this embodiment of the present disclosure, the network device may send, in the unlicensed band 0, the configuration information for indicating the unlicensed band set, to configure a new unlicensed band set for the terminal device. This is not limited in the present disclosure.

In an implementation, the transceiver 820 in the network device is configured to send the configuration information for indicating the unlicensed band set. Alternatively, the processor 810 in the network device controls the transceiver 820 to send the configuration information for indicating the unlicensed band set.

In an implementation, the transceiver 920 in the terminal device may be configured to receive the configuration information for indicating the unlicensed band set. Alternatively, the processor 910 in the terminal device controls the transceiver 920 to receive the configuration information for indicating the unlicensed band set.

S403: The terminal device determines the unlicensed band set.

The terminal device determines the unlicensed band set based on the received configuration information for indicating the unlicensed band set.

In an implementation, the processor 910 in the terminal device 111 or 112 may be configured to determine the unlicensed band set.

S404: The network device sends second indication information to the terminal device. Correspondingly, the terminal device receives the second indication information.

The second indication information is used to indicate D control channel resource groups, and each of the control channel resource groups includes one or more control channel resource sets, where D is a positive integer. It should be noted that, the one or more control channel resource sets in the control channel resource group are always determined to belong to a same available unlicensed band in subsequent steps S408 and S410, or in S509 and S510. To be specific, the network device and the terminal device always determine, based on a granularity of the control channel resource group, an unlicensed band to which the control channel resource set belongs. When the control channel resource group includes only one control channel resource set, information represented by the control channel resource group is the same as information represented by the control channel resource set. Alternatively, in this case, the control channel resource group is the control channel resource set. Correspondingly, that the second indication information is used to indicate the control channel resource group may be understood as that the second indication information is used to indicate the control channel resource set.

It should be noted that, in the embodiments of the present disclosure, the control channel resource set represents a set of resources for transmitting control signaling. The control signaling may be physical layer control signaling. One control channel resource set may carry (or transmit) a plurality of pieces of control signaling. However, one piece of control signaling can be transmitted only on a same control channel resource set. To be specific, a same piece of control signaling cannot occupy two or more control channel resource sets.

The control channel resource set may be a set of resources for carrying an enhanced physical downlink control channel (EPDCCH) in an LTE system. The control channel resource set may alternatively be a control-resource set (CORSET) for carrying a physical downlink control channel in a 5G (NR) system. The control channel resource set may alternatively be a set of resources for carrying another control channel in another radio access technology. This is not limited in the present disclosure.

Specifically, the second indication information may include at least one of the following information:

(1) information for indicating a sequence number (or an index or an identifier) or a priority of the control channel resource group;

(2) information for indicating a quantity of the control channel resource groups, for example, the D control channel resource groups; and (3) information for indicating the one or more control channel resource sets included in the control channel resource group, where for each control channel resource set, the second indication information may further include at least one of the following information:

(3-1) information for indicating a size of a time-frequency resource occupied by the control channel resource set;

(3-2) information for indicating a relative position of the control channel resource set in an unlicensed band;

(3-3) information for indicating a demodulation reference signal corresponding to the control channel resource set;

(3-4) information for indicating whether the control channel resource set is a first control channel resource set and/or information for indicating whether the control channel resource set is a second control channel resource set;

(3-5) information for indicating a sequence number (or an index or an identifier) of the control channel resource set; and (3-6) information for indicating a pattern (Pattern) of the control channel resource set, for example, periodicity information.

The following separately describes the information (1), (2), and (3-1) to (3-6).

The information (1) is the information used to indicate the sequence number (or the index or the identifier) and/or the priority of the control channel resource group. Each control channel resource group may correspond to one sequence number (or index or identifier) and/or one priority. For example, the sequence number (or the index or the identifier) is 0. The sequence number may identify one control channel resource group. The sequence number may be used to determine, in the subsequent step S410, an unlicensed band to which the control channel resource group belongs. The sequence number may be explicit sequence number information. Alternatively, the sequence number may be implicitly represented by an order in which the control channel resource groups appear in the second indication information. The priority information may be 0, 1, 2, or the like, and represents different control channel resource groups. The priority may be used to represent that when C first unlicensed bands are determined, an unlicensed band to which a control channel resource group having a higher priority (or a lower priority) belongs is preferentially determined. When a plurality of control channel resource groups have a same priority, unlicensed bands to which the plurality of control channel resource groups belong may be determined in (e.g., descending or ascending) order of sequence numbers.

Information (2) is information used to indicate the quantity of the control channel resource groups. For example, that D=3 represents three control channel resource groups. The quantity information may be explicit quantity information, or may be implicitly represented by the quantity of the control channel resource groups.

The information (3-1) may include a quantity of time length units occupied in time and/or a quantity of frequency domain width units occupied in frequency domain. For example, the time length unit may be an orthogonal frequency division multiplexing (OFDM) symbol, a slot, or a mini slot, a transmission time interval (TTI), a subframe, a sub transmission time interval (sTTI), or another time length unit. This is not limited in the present disclosure. The frequency domain width unit may be a subcarrier, a resource element (RE), a physical resource block (PRB), a resource block group (RBG), Hertz (Hz), a control channel element (CCE), or another frequency domain width unit. This is not limited in the present disclosure. It may be understood that, the size information of the time-frequency resource may include only a size of the time-frequency resource in time, or may include only a size of the time-frequency resource in frequency domain. When only one piece of information is included, the other piece of information is obtained in another manner, for example, is specified in a protocol, or is obtained by using other information. Optionally, if sizes of time-frequency resources occupied by a plurality of control channel resource sets are the same, for the plurality of control channel resource sets, the second indication information may include only one piece of information (3-1). In this case, signaling overheads of the second indication information can be reduced.

The information (3-2) is information used to indicate relative positions of the control channel resource sets in unlicensed bands, for example, a start time position of the control channel resource set in the unlicensed band and/or a start frequency domain position of the control channel resource set in the unlicensed band. The start time position is, for example, a symbol, a slot, a mini slot, a TTI, an sTTI, or a subframe from which the control channel resource set starts in time domain. The start frequency domain position is, for example, a subcarrier, a PRB, an RBG, or Hz from which the control channel resource set starts in frequency domain. It may be understood that, the relative position information may include only a time position, or may include only a frequency domain position. When only one piece of information is included, the other piece of information is obtained in another manner, for example, is specified in a protocol, or is obtained by using other information. Optionally, if relative positions of a plurality of control channel resource sets in unlicensed bands are the same, for the plurality of control channel resource sets, the second indication information may include only one piece of information (3-2). In this case, signaling overheads of the second indication information can be reduced.

The terminal device may determine, based on the time-frequency resource size indicated by the information (3-1) and/or the relative position that is in the unlicensed band and that is indicated by the information (3-2), time domain resources and/or frequency domain resources actually occupied by control channel resource sets. For example, a control channel resource set occupies two symbols starting from the first OFDM symbol of a subframe in time, to be specific, the control channel resource set occupies the first and the second OFDM symbols of the subframe in time; and/or, one control channel resource set occupies four PRBs starting from the first PRB in frequency domain, to be specific, the control channel resource set is used for the first PRB to the fourth PRBs in frequency domain. It may be understood that, when one control channel resource set occupies a plurality of PRBs in frequency domain, the plurality of PRBs may be contiguous PRBs or noncontiguous PRBs in frequency domain. This is not limited in the present disclosure.

The information (3-3) is information used to indicate demodulation reference signals corresponding to the control channel resource sets. The terminal device performs channel estimation by using a demodulation reference signal. Then, the terminal device receives downlink control information on the control channel resource set. Further, demodulation reference signals used when downlink control channels are transmitted on different control channel resource sets may be the same or may be different. Optionally, if demodulation reference signals used by a plurality of control channel resource sets are the same, for the plurality of control channel resource sets, the second indication information may include only one piece of information (3-3). In this case, signaling overheads of the second indication information can be reduced.

The information (3-4) is information used to indicate whether control channel resource sets are first control channel resource sets; and/or the information (3-4) is information used to indicate whether control channel resource sets are second control channel resource sets. Alternatively, the information (3-4) is information used to indicate whether control channel resource groups are first control channel resource groups; and/or the information (3-4) is information used to indicate whether control channel resource groups are second control channel resource groups. The first control channel resource group represents that all control channel resource sets included in the control channel resource group are first control channel resource sets. The second control channel resource group represents that all control channel resource sets included in the control channel resource group are second control channel resource sets.

For a specific terminal device such as the terminal device 111, the first control channel resource set includes the following features:

The network device sends downlink control information (e.g., scheduling information) to the terminal device 111 by using the first control channel resource set. The terminal device 111 receives the downlink control information by using the first control channel resource set.

When a time-frequency resource (alternatively referred to as a data resource) that carries data of the terminal device 111 conflicts with the first control channel resource set (e.g., at least a part of a time-frequency resource occupied by the first control channel resource set overlaps a part of the time-frequency resource that carries the data of the terminal device 111), the network device does not transmit the data of the terminal device 111 on the conflicting time-frequency resource. In this case, when mapping the data to a time-frequency resource, the network device bypasses the conflicting time-frequency resource. The feature may be referred to as rate matching. In this way, reliability of the downlink control information transmitted on the first control channel resource set can be ensured. Alternatively, the network device punctures the data of the terminal device 111 on the conflicting time-frequency resource. In this case, when mapping the data to a time-frequency resource, the network device does not bypass the conflicting time-frequency resource, but discards data that should be mapped to the conflicting time-frequency resource. Correspondingly, the terminal device may not process information carried on the conflicting time-frequency resource. The feature may be referred to as puncturing. In this way, a data processing process of the network device can be simplified.

For a specific terminal device such as the terminal device 111, the second control channel resource set includes the following features:

The second control channel resource set cannot be used to transmit downlink control information of the terminal device 111.

When a time-frequency resource (alternatively referred to as a data resource) that carries data of the terminal device 111 conflicts with the second control channel resource set (e.g., at least a part of a time-frequency resource occupied by the second control channel resource set overlaps a part of the time-frequency resource that carries the data of the terminal device 111), the network device does not transmit the data of the terminal device 111 on the conflicting time-frequency resource. In this case, when mapping the data to a time-frequency resource, the network device bypasses the conflicting time-frequency resource. The feature may be referred to as rate matching. In this way, reliability of downlink control information of another terminal device that is transmitted on the second control channel resource set can be ensured. Alternatively, the network device punctures the data of the terminal device 111 on the conflicting time-frequency resource. In this case, when mapping the data to a time-frequency resource, the network device does not bypass the conflicting time-frequency resource, but discards data that should be mapped to the conflicting time-frequency resource. Correspondingly, the terminal device may not process information carried on the conflicting time-frequency resource. The feature may be referred to as puncturing. In this way, a data processing process of the network device can be simplified.

A second control channel resource set configured for the terminal device 111 may be the same as a first control channel resource set configured for the terminal device 112. To be specific, a same control channel resource set is a first control channel resource set for one terminal device, and is a second control channel resource set for another terminal device.

Usually, the one or more control channel resource sets indicated by the second indication information include one or more first control channel resource sets and/or one or more second control channel resource sets.

The information (3-5) is used to indicate the sequence number (or the index or the identifier) of the control channel resource set. Each control channel resource set may correspond to one sequence number (or index or identifier) and/or one priority. For example, the sequence number (or the index or the identifier) is 0, 1, 2, or the like. The sequence number may identify one control channel resource set. Sequence numbers of a plurality of control channel resource sets included in a same control channel resource group are different. Sequence numbers of control channel resource sets included in different control channel resource groups may be the same. The sequence number may be explicit sequence number information. Alternatively, the sequence number may be implicitly represented by an order in which channel resource sets appear in a control channel resource group. An implementation of a sequence number of a control channel resource set is numbering the control channel resource set based on a control channel resource group to which the control channel resource set belongs. Another implementation of a sequence number of a control channel resource set may be numbering the control channel resource set based on all control channel resource sets included in all configured control channel resource groups. For example, it is assumed that there are two control channel resource groups, and each control channel resource group includes two control channel resource sets. In this case, an implementation of a sequence number of a control channel resource set is numbering two control channel resource sets in a first control channel resource group 0 and 1, and numbering two control channel resource sets in a second control channel resource group 0 and 1. Another implementation of a sequence number of a control channel resource set is numbering two control channel resource sets in a first control channel resource group 0 and 1, and numbering two control channel resource sets in a second control channel resource group 2 and 3.

The information (3-6) is information for indicating the pattern of the control channel resource set. Specifically, the pattern may be a periodicity. The periodicity may be M time units, and M is a positive integer. The time unit may be a symbol, a slot, a mini slot, a TTI, an sTTI, or a subframe, or may be in another expression form. This is not specifically limited.

The second indication information may be sent by using radio resource control (RRC) layer control signaling, media access control (MAC) layer control signaling, or physical layer control signaling. This is not limited in the present disclosure. When the second indication information is sent by using the RRC layer control signaling, the second indication information may be a dedicated RRC message or a system broadcast message. It may be understood that, the second indication information in step 404 and the information in step 402 may be sent by using a same message, or may be sent by using different messages. This is not limited in the present disclosure. It should be indicated that the second indication information in step S404 and information in step S406 may be sent by using a same message, or the second indication information in step S404 is sent after step S406.

It should be noted that, the second indication information may be sent in a licensed band. Alternatively, the second indication information may be sent in any unlicensed band in which the second indication information can be transmitted. For example, if the terminal device and the network device can transmit control information and data by using an unlicensed band (e.g., an unlicensed band 0) by executing this embodiment of the present disclosure, the network device may send the second indication information in the unlicensed band 0, and configure a new control channel resource group for the terminal device. This is not limited in the present disclosure.

In step S404, the control channel resource group is not semi-statically (or fixedly) configured to belong to a specific unlicensed band. The unlicensed band to which the control channel resource group belongs is determined by using subsequent steps S408 and S410 or S509 and S510.

The transceiver 820 in the network device is configured to send the second indication information. Alternatively, the processor 810 in the network device controls the transceiver 820 to send the second indication information.

The transceiver 920 in the terminal device may be configured to receive the second indication information. Alternatively, the processor 910 in the terminal device controls the transceiver 920 to receive the second indication information.

S405: The network device determines an available unlicensed band set.

The available unlicensed band set includes B unlicensed bands, and the available unlicensed band set is a subset of the unlicensed band set, where B is a positive integer.

Specifically, the network device listens to the unlicensed band set, to be specific, performs an LBT operation on at least one of the A unlicensed bands included in the configured unlicensed band set.

The network device obtains (or determines) the available unlicensed band set through LBT. To be specific, the network device obtains available unlicensed bands.

Optionally, the network device may alternatively not perform LBT, but obtain the available unlicensed band set by using information provided by the terminal device or another network device.

The processor 810 in the network device may be configured to perform LBT, that is, listen to the unlicensed band set. Alternatively, the processor 810 in the network device controls the transceiver 820 to perform LBT.

S406: The network device sends fourth indication information to the terminal device. Correspondingly, the terminal device receives the fourth indication information. The fourth indication information is used to indicate the available unlicensed band set.

The fourth indication information may be a reference signal. For example, when determining that an unlicensed band is available, the network device may send a reference signal in the unlicensed band. If the terminal device detects the reference signal in a configured unlicensed band, it indicates that the unlicensed band is an available unlicensed band. The reference information may be a cell-specific reference signal (CRS). The CRS is a reference signal that can be identified by all terminal devices accessing the network device, or a terminal-specific reference signal (UE-Specific Reference signal). The reference signal includes but is not limited to a channel state information reference signal (CSI-RS), a demodulation reference signal (DM-RS), and a reference signal, for example, a DMRS used for a physical downlink shared channel (PDSCH), a phase tracking reference signal (PT-RS) used for a PDSCH, a DMRS used for a PDCCH, a DMRS used for a physical broadcast channel, and a synchronization signal, used in an NR system. For example, the network device may send CRSs on all the unlicensed bands in the available unlicensed band set. Specifically, a same CRS may be sent on each available unlicensed band, a different CRS may be sent on each available unlicensed band, or CRSs sent on some available unlicensed bands are different from CRSs sent on the other available unlicensed bands. Another reference signal may also be sent and determined in the foregoing manner. Details are not described.

The fourth indication information may be a preamble sequence (Preamble). The network device may send preamble sequences on all the available unlicensed bands in the available unlicensed band set. Specifically, a same preamble sequence may be sent on each available unlicensed band, a different preamble sequence is sent on each available unlicensed band, or preamble sequences sent on some available unlicensed bands are different from preamble sequences sent on the other available unlicensed bands.

The fourth indication information may alternatively be control information, for example, control information sent by using a radio resource control (RRC) layer, a media access control (MAC) layer, or a physical layer. This is not limited in the present disclosure. When the fourth indication information is the control information sent by using the RRC layer, the fourth indication information may be a dedicated RRC message or a system broadcast message.

When the fourth indication information is the control information, in an implementation, the fourth indication information includes a sequence number (or an index) or an identifier of each unlicensed band in the available unlicensed band set. The sequence number (or the index) or the identifier is the sequence number (or the index) or the identifier that is included in the configuration information for indicating the unlicensed band set in step 402. For example, in the unlicensed band set, the unlicensed band 0 (to be specific, a sequence number or an identifier of the unlicensed band is 0) is an available unlicensed band, an unlicensed band 2 is an available unlicensed band, and an unlicensed band 3 is an available unlicensed band. An advantage of this manner of indicating sequence numbers is that when the unlicensed band set includes a large quantity of unlicensed bands, and the available unlicensed band set includes a small quantity of unlicensed bands, signaling overheads of the fourth indication information can be reduced.

Figure 4B:
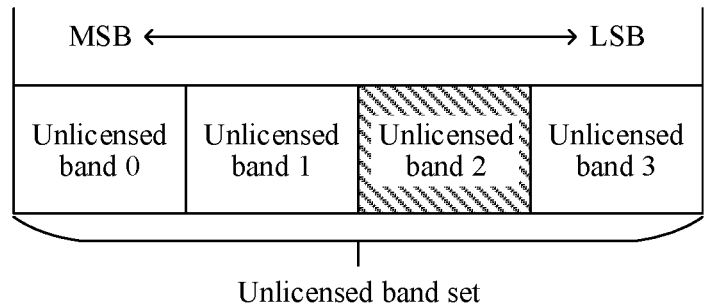
FIG. 4b is a schematic diagram of a correspondence between a bitmap and unlicensed bands according to an embodiment of the present disclosure.
Figure 4C:
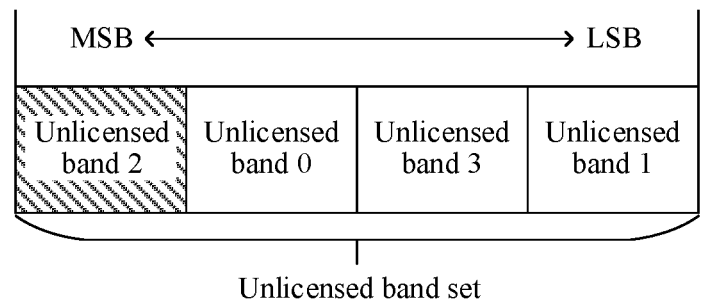
FIG. 4c is a schematic diagram of another correspondence between bits in a bitmap and unlicensed bands according to an embodiment of the present disclosure.

When the fourth indication information is the control information, in another implementation, the fourth indication information may be in a form of a bitmap for indicating the available unlicensed band set. Each bit in the bitmap corresponds to one unlicensed band in the unlicensed band set. In the bitmap, if a value of a bit is 1, it indicates that a corresponding unlicensed band is an available unlicensed band; if a value of a bit is 0, it indicates that a corresponding unlicensed band is not an available unlicensed band. When FIG. 4b is used as an example of the fourth indication information, FIG. 4b shows an example in which an MSB to an LSB respectively correspond one-to-one to the A unlicensed bands in ascending order of sequence numbers. As shown in FIG. 4b, it is assumed that the unlicensed band set includes four unlicensed bands that are represented as an unlicensed band 0 to an unlicensed band 3. That is, A=4. The bitmap includes four bits. The first bit on the left is a most significant bit (MSB), and the first bit on the right is a least significant bit (LSB). The first bit (the MSB) to the fourth bit (the LSB) in the bitmap correspond to the unlicensed band 0 to the unlicensed band 3 in the unlicensed band set. As shown in FIG. 4b, the unlicensed bands 0, 1, and 3 are available, and the unlicensed band 2 is unavailable (as represented by oblique lines in the figure). In this case, a bitmap value is 1101. To be specific, the network device may represent, by setting the bitmap to 1101, that unlicensed bands 0, 1, and 3 are available and the unlicensed band 2 is unavailable. Correspondingly, the terminal device may obtain, by using the bitmap value 1101, the available unlicensed band set including the unlicensed bands 0, 1, and 3. When FIG. 4c is used as an example of the fourth indication information, FIG. 4c shows an example in which an MSB to an LSB respectively correspond one-to-one to the A unlicensed bands in order of sequence numbers 2, 0, 3, and 1. As shown in FIG. 4c, it is assumed that the unlicensed band set includes the four unlicensed bands that are represented as the unlicensed band 0 to the unlicensed band 3. The first bit (MSB) to the fourth bit (LSB) in the bitmap respectively correspond to unlicensed bands 2, 0, 3, and 1 in the unlicensed band set. The unlicensed bands 0, 1, and 3 are available, and the unlicensed band 2 is unavailable (as represented by oblique lines in the figure). In this case, a bitmap value is 0111. To be specific, the network device may represent, by setting the bitmap to 0111, that unlicensed bands 0, 1, and 3 are available and the unlicensed band 2 is unavailable. Correspondingly, the terminal device may obtain, by using the bitmap value 0111, the available unlicensed band set including the unlicensed bands 0, 1, and 3. It may be understood that, the bits in the bitmap may alternatively correspond to the A unlicensed bands in another order (e.g., in order from the LSB to the MSB). This is not limited in the present disclosure. It may be further understood that, the A unlicensed bands may correspond to the bits (from the MSB to the LSB or from the LSB to the MSB) in the bitmap in another order. This is not limited in the present disclosure. A specific correspondence may be specified in a protocol, or may be notified to the terminal device by using control information sent by the network device.

An advantage of using the bitmap is that each unlicensed band in the unlicensed band set can be represented by using only one bit. When the unlicensed band set includes a large quantity of unlicensed bands, and/or the available unlicensed band set includes a large quantity of unlicensed bands, signaling overheads of the fourth indication information can be reduced.

The fourth indication information may be sent by using radio resource control (RRC) layer control signaling, media access control (MAC) layer control signaling, or physical layer control signaling. This is not limited in the present disclosure. When the fourth indication information is sent by using the RRC layer control signaling, the fourth indication information may be a dedicated RRC message or a system broadcast message.

It should be noted that, the fourth indication information may be sent in a licensed band. Alternatively, the fourth indication information may be sent in any unlicensed band in which the fourth indication information can be transmitted. For example, if the terminal device and the network device can transmit control information and data by using an unlicensed band (e.g., the unlicensed band 0) by executing this embodiment of the present disclosure, the network device may send the fourth indication information in the unlicensed band 0, and notifies the terminal device of a new available unlicensed band set.

Further, the fourth indication information may be scrambled by using a cell-common radio network temporary identifier (RNTI), or the fourth indication information may be scrambled by using a UE-specific RNTI.

The transceiver 820 in the network device may be configured to send the fourth indication information. Alternatively, the processor 810 in the network device controls the transceiver 820 to send the fourth indication information.

The transceiver 920 in the terminal device may be configured to receive the fourth indication information. Alternatively, the processor 910 in the terminal device controls the transceiver 920 to send the fourth indication information.

S407: The terminal device determines the available unlicensed band set.

The terminal device may determine the available unlicensed band set based on the fourth indication information.

Specifically, when the fourth indication information is a reference signal, the terminal device may obtain the available unlicensed band set based on the reference signal, to be specific, obtains an available unlicensed band. In other words, the terminal device may determine the available unlicensed band set depending on whether there is a reference signal.

When the fourth indication information is a preamble sequence (Preamble), the terminal device may obtain the available unlicensed band set based on the preamble sequence, that is, obtains an available unlicensed band. In other words, the terminal device may determine the available unlicensed band set depending on whether there is a preamble sequence.

When the fourth indication information is control information, the terminal device determines the available unlicensed band set by reading the control information.

In an implementation, the processor 910 in the terminal device may be configured to determine the available unlicensed band set.

S408: The network device determines the C first unlicensed bands in the available unlicensed band set, where the first unlicensed band includes a control channel, and C is a positive integer. To be specific, the first unlicensed band carries at least one of the D control channel resource groups.

The network device may determine the C first unlicensed bands with reference to factors such as load and interference of available unlicensed bands or a resource management policy of the network device. The network device determines that a control channel resource group is carried on each of the C first unlicensed bands in the available unlicensed band set. To be specific, the network device determines that at least C of the D control channel resource groups belong to one of the C first unlicensed bands.

In an implementation (e.g., a manner 1), an $i^{th}$ control channel resource group belongs to an $i^{th}$ first unlicensed band, where $1 \leq i \leq C$.

In another implementation (e.g., a manner 2), a $j^{th}$ control channel resource group belongs to a $(((j-1) \bmod C)+1)^{th}$ first unlicensed band, where $1 \leq j \leq D$.

In the formula in the foregoing manner 2, (j−1) mod C means calculating a remainder of (j−1) divided by C. Mod in the embodiments of the present disclosure means calculating a remainder of one number divided by another number. Details are not described again later.

In the foregoing manner 1, if the determined C is greater than or equal to D, it is determined that each of all the D control channel resource groups can belong to one first unlicensed band. If the determined C is less than D, it is determined that the first C control channel resource groups belong to one first unlicensed band. In this case, the last (D-C) control channel resource groups may not belong to any first unlicensed band. In the foregoing manner 2, it may be determined that each of the D control channel resource groups belongs to one first unlicensed band. In addition, when D is greater than C, it may be determined that two or more control channel resource groups belong to a same first unlicensed band. When D is less than or equal to C, the manner 1 and the manner 2 achieve same effects.

In a specific implementation, the first to a $D^{th}$ control channel resource groups are in ascending order of sequence numbers or priorities; or the first to a $D^{th}$ control channel resource groups are in descending order of sequence numbers or priorities.

In a specific implementation, the first to a $C^{th}$ first unlicensed bands are in ascending order of frequencies or sequence numbers;

the first to a $C^{th}$ first unlicensed bands are in descending order of frequencies or sequence numbers;

when the fourth indication information is a bitmap, the first to a $C^{th}$ first unlicensed bands are in order from an unlicensed band corresponding to a most significant bit in the fourth indication information to an unlicensed band corresponding to a least significant bit in the fourth indication information;

when the fourth indication information is a bitmap, the first to a $C^{th}$ first unlicensed bands are in order from an unlicensed band corresponding to a least significant bit in the fourth indication information to an unlicensed band corresponding to a most significant bit in the fourth indication information;

the first to a $C^{th}$ first unlicensed bands are in front-to-back order of positions of first unlicensed bands in first indication information;

the first to a $C^{th}$ first unlicensed bands are in back-to-front order of positions of first unlicensed bands in first indication information;

when first indication information in step S409 is a bitmap, the first to a $C^{th}$ first unlicensed bands are in order from an unlicensed band corresponding to a most significant bit in the first indication information to an unlicensed band corresponding to a least significant bit in the first indication information;

when first indication information in step S409 is a bitmap, the first to a $C^{th}$ first unlicensed bands are in order from an unlicensed band corresponding to a least significant bit in the first indication information to an unlicensed band corresponding to a most significant bit in the first indication information; or when first indication information in step S409 includes sequence numbers (or indexes or identifiers) of the C first unlicensed bands, the first to a $C^{th}$ first unlicensed bands are in order of positions of the sequence numbers of the C first unlicensed bands in the first indication information, where for specific information of the first indication information, refer to S409.

In an implementation, the processor 810 in the network device may be configured to determine the C first unlicensed bands.

S409: The network device sends the first indication information to the terminal device, where the first indication information is used to indicate the determined C first unlicensed bands. Correspondingly, the terminal device receives the first indication information.

Specifically, the network device sends the first indication information to the terminal device by using a licensed band;

the network device sends the first indication information to the terminal device by using at least one unlicensed band in the available unlicensed band set; or the network device sends the first indication information to the terminal device by using at least one of the determined C first unlicensed bands. The following describes, by using an example in which the first indication information is sent to the terminal device by using one unlicensed band, content included in the first indication information.

In an implementation, the first indication information is a bitmap. The bitmap includes at least one bit. The following provides four implementations in which the first indication information is a bitmap. In any one of the four implementations, if a value of a bit in the bitmap is 1, it represents that an unlicensed band corresponding to the bit is the first unlicensed band. To be specific, that the value of the bit is 1 represents that the unlicensed band corresponding to the bit carries at least one of the D control channel resource groups. That a value of a bit in the bitmap is 0 represents that an unlicensed band corresponding to the bit is not the first unlicensed band, represents that an unlicensed band corresponding to the bit does not carry any one of the D control channel resource groups, and/or represents that an unlicensed band corresponding to the bit is an unavailable unlicensed band (to be specific, the unlicensed band corresponding to the bit does not belong to the available unlicensed band set).

In a first implementation (e.g., a manner 1) of the bitmap, the at least one bit is A bits, and the A bits in the bitmap correspond to the A unlicensed bands. An advantage of such an implementation is that only one bit is required for representing each unlicensed band, so that signaling overheads are relatively low. In addition, a quantity of bits included in the bitmap is the same as a quantity of the unlicensed bands in the unlicensed band set. Therefore, the quantity of the bits included in the bitmap is unchanged, and this helps reduce processing complexity.

For example (e.g., a manner 1-1), a most significant bit (MSB) to a least significant bit (LSB) in the bitmap respectively correspond one-to-one to the A unlicensed bands in ascending order of frequencies, priorities, or sequence numbers. Alternatively, an MSB to an LSB in the bitmap respectively correspond one-to-one to the A unlicensed bands in descending order of frequencies, priorities, or sequence numbers. It may be understood that, alternatively, an LSB to an MSB in the bitmap may correspond to the A unlicensed bands in a similar manner. When FIG. 4b is used as an example of the first indication information, FIG. 4b shows an example in which the MSB to the LSB respectively correspond one-to-one to the A unlicensed bands in ascending order of sequence numbers, and one block in FIG. 4b represents one bit. It is assumed that A=4, B=3, C=2, D=2, the sequence numbers of the unlicensed bands included in the unlicensed band set are 0, 1, 2, and 3, the sequence numbers of the unlicensed bands in the available unlicensed band set are 0, 2, and 3, a sequence number of the unlicensed band for sending the first indication information is 2 (as represented by using filled oblique lines in the figure), and the network device determines that the unlicensed band 0 and the unlicensed band 2 are first unlicensed bands. In this case, values of the bits shown in FIG. 4b are 1010. Sequence numbers of unlicensed bands corresponding to 1010 are 0, 1, 2, and 3 respectively.

For another example (e.g., a manner 1-2), the first bit to an $A^{th}$ bit in the bitmap are in a direction from an MSB to an LSB in the bitmap. The first bit corresponds to the unlicensed band for sending the first indication information. The second bit to a $B^{th}$ bit respectively correspond, in ascending (or descending) order of frequencies, priorities, or sequence numbers, one-to-one to unlicensed bands that are other than the unlicensed band for sending the first indication information and that are in the B available unlicensed bands. A $(B+1)^{th}$ bit to the $A^{th}$ bit respectively correspond one-to-one to unlicensed bands other than the B available unlicensed bands in the A unlicensed bands in ascending (or descending) order of frequencies, priorities, or sequence numbers. It may be understood that, alternatively, an LSB to an MSB in the bitmap may correspond to the A unlicensed bands in a similar manner. When FIG. 4c is used as an example of the first indication information, FIG. 4c shows another example in which the MSB to the LSB respectively correspond to the A unlicensed bands, and one block in FIG. 4c represents one bit. As shown in FIG. 4c, it is assumed that the unlicensed band set includes unlicensed bands 0, 1, 2, and 3, that is, A=4, the available unlicensed band set includes the unlicensed bands 0, 2, and 3, that is, B=3, C=2, D=2, and the network device sends the first indication information by using the unlicensed band 2. In this case, the first bit in the bitmap corresponds to the unlicensed band 2 (as represented by using filled oblique lines in the figure). The second bit to the third bit respectively correspond to the unlicensed bands 0 and 3 (in ascending order of sequence numbers of the unlicensed bands in the available unlicensed band set). The fourth bit corresponds to the unlicensed band 1 (an unavailable unlicensed band). The network device determines that the unlicensed band 0 and the unlicensed band 2 are first unlicensed bands. In this case, values of the bits shown in FIG. 4c are 1100.

For another example (e.g., a manner 1-3), the first bit to an $A^{th}$ bit in the bitmap are in a direction from an MSB to an LSB in the bitmap. The first bit to an $x^{th}$ bit respectively correspond, in ascending (or descending) order of frequencies or sequence numbers, one-to-one to x unlicensed bands starting from the unlicensed band for sending the first indication information, where the $x^{th}$ bit corresponds to an unlicensed band having a highest (or lowest) frequency or sequence number. An $(x+1)^{th}$ bit to the $A^{th}$ bit respectively correspond one-to-one to A-x unlicensed bands in ascending order of frequencies or sequence numbers. x is a positive integer, and is less than or equal to A. It may be understood that, alternatively, an LSB to an MSB in the bitmap may correspond to the A unlicensed bands in a similar manner. For example, it is assumed that the unlicensed band set includes unlicensed bands 0, 1, 2, and 3, that is, A=4, the available unlicensed band set includes the unlicensed bands 0, 2, and 3, that is, B=3, C=2, D=2, and the network device sends the first indication information by using the unlicensed band 2. In this case, the first bit in the bitmap corresponds to the unlicensed band 2. The second bit corresponds to the unlicensed band 3. The third bit corresponds to the unlicensed band 0. The fourth bit corresponds to the unlicensed band 1. The network device determines that the unlicensed band 0 and the unlicensed band 2 are first unlicensed bands. In this case, values of the bits in the bitmap are 1100.

It may be understood that, the bits in the bitmap may alternatively correspond to the A unlicensed bands in another order (e.g., in order from the LSB to the MSB). This is not limited in the present disclosure. It may be further understood that, the A unlicensed bands may correspond to the bits (from the MSB to the LSB or from the LSB to the MSB) in the bitmap in another order. This is not limited in the present disclosure. A specific correspondence may be specified in a protocol, or may be notified to the terminal device by using control information sent by the network device.

In a second implementation (e.g., a manner 2) of the bitmap, the bitmap includes A-1 bits. The A-1 bits correspond to A-1 unlicensed bands. The A-1 unlicensed bands are unlicensed bands that are other than the first unlicensed band for sending the first indication information and that are in the A unlicensed bands. Values of the A bits are used to indicate whether corresponding unlicensed bands are the first unlicensed bands. An advantage of such an implementation is that only one bit is required for representing each unlicensed band, so that signaling overheads are relatively low. In addition, a quantity of bits included in the bitmap is the same as a quantity of the unlicensed bands in the unlicensed band set. Therefore, the quantity of the bits included in the bitmap is unchanged, and this helps reduce processing complexity. Because a value of a bit representing the first unlicensed band for sending the first indication information is constantly 1, the bitmap does not need to include the bit corresponding to the first unlicensed band for sending the first indication information. Compared with signaling overheads in the manner 1, signaling overheads are smaller.

For example (e.g., a manner 2-1), a most significant bit (MSB) to a least significant bit (LSB) in the bitmap respectively correspond, in ascending order (or in a descending order) of frequencies, priorities, or sequence numbers, one-to-one to the unlicensed bands that are other than the unlicensed band for sending the first indication information and that are in the A unlicensed bands. It may be understood that, alternatively, an LSB to an MSB in the bitmap may correspond to the A unlicensed bands in a similar manner. When FIG. 4b is used as an example of the first indication information, a difference between the manner 2 and the manner 1 is that the bitmap in the manner 2 does not include a bit corresponding to the unlicensed band 2 (as represented by using filled oblique lines in the figure). When a same assumption as that in the manner 1 is used, a value of the bitmap in the manner 2 is 100.

For another example (e.g., a manner 2-2), the first bit to an $(A-1)^{th}$ bit in the bitmap are in a direction from an MSB to an LSB in the bitmap. Starting from the MSB, the first bit to a $(B-1)^{th}$ bit respectively correspond, in ascending (or descending) order of frequencies, priorities, or sequence numbers, one-to-one to unlicensed bands that are other than the unlicensed band for sending the first indication information and that are in the B available unlicensed bands. Starting from the MSB, a $B^{th}$ bit to an $(A-1)^{th}$ bit respectively correspond one-to-one to unlicensed bands other than the B available unlicensed bands in the A unlicensed bands in ascending (or descending) order of frequencies, priorities, or sequence numbers. It may be understood that, the LSB to the MSB in the bitmap may alternatively correspond, in a similar manner, to the unlicensed bands that are other than the unlicensed band for sending the first indication information and that are in the A unlicensed bands. When FIG. 4c is used as an example of the first indication information, a difference between the manner 2 and the manner 1 is that the bitmap in the manner 2 does not include a bit corresponding to the unlicensed band 2 (as represented by using filled oblique lines in the figure). When a same assumption as that in the manner 1 is used, a value of the bitmap in the manner 2 is 100.

For another example (e.g., a manner 2-3), the first bit to an $(A-1)^{th}$ bit in the bitmap are in a direction from an MSB to an LSB in the bitmap. The first bit to an $x^{th}$ bit respectively correspond, in ascending (or descending) order of frequencies or sequence numbers, one-to-one to x unlicensed bands starting from the unlicensed band for sending the first indication information (where the x unlicensed bands do not include the unlicensed band for sending the first indication information), where the $x^{th}$ bit corresponds to an unlicensed band having a highest (or lowest) frequency or sequence number. An $(x+1)^{th}$ bit to the $(A-1)^{th}$ bit respectively correspond one-to-one to A-x unlicensed bands in ascending order of frequencies or sequence numbers. x is a positive integer, and is less than or equal to A-1. It may be understood that, alternatively, an LSB to an MSB in the bitmap may correspond to A-1 unlicensed bands in a similar manner. For example, it is assumed that the unlicensed band set includes unlicensed bands 0, 1, 2, and 3, that is, A=4, the available unlicensed band set includes the unlicensed bands 0, 2, and 3, that is, B=3, C=2, D=2, and the network device sends the first indication information by using the unlicensed band 2. In this case, the first bit in the bitmap corresponds to the unlicensed band 3. The second bit corresponds to the unlicensed band 0. The third bit corresponds to the unlicensed band 1. The fourth bit corresponds to the unlicensed band 2. The network device determines that the unlicensed band 0 and the unlicensed band 2 are first unlicensed bands. In this case, values of the bits in the bitmap are 100.

It may be understood that, the bits in the bitmap may alternatively correspond to the A-1 unlicensed bands in another order (e.g., in order from the LSB to the MSB). This is not limited in the present disclosure. It may be further understood that, the A-1 unlicensed bands may correspond to the bits (from the MSB to the LSB or from the LSB to the MSB) in the bitmap in another order. This is not limited in the present disclosure. A specific correspondence may be specified in a protocol, or may be notified to the terminal device by using control information sent by the network device.

In a third implementation (e.g., a manner 3) of the bitmap, the bitmap includes B bits. The B bits respectively correspond to the B available unlicensed bands. A value of each bit in the bitmap is used to indicate whether a corresponding unlicensed band is the first unlicensed band. Compared with the bitmap in the manner 1, the bitmap in the manner 3 does not carry a bit corresponding to an unavailable unlicensed band. Therefore, more signaling overheads can be reduced.

Figure 4D:
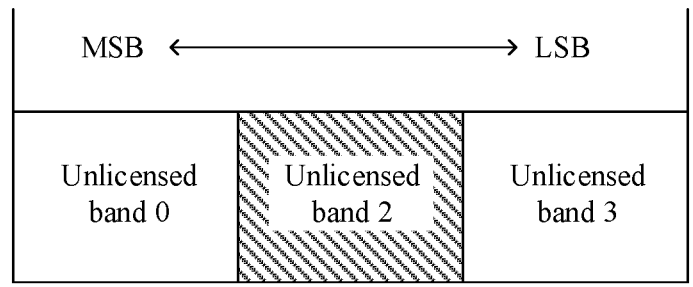
FIG. 4d is a schematic diagram of another correspondence between bits in a bitmap and unlicensed bands according to an embodiment of the present disclosure.

For example (e.g., a manner 3-1), a most significant bit (MSB) to a least significant bit (LSB) in the bitmap respectively correspond one-to-one to the B available unlicensed bands in ascending (or descending) order of frequencies, priorities, or sequence numbers. It may be understood that, alternatively, an LSB to an MSB in the bitmap may correspond to the B available unlicensed bands in a similar manner. FIG. 4d shows an example in which the MSB to the LSB respectively correspond one-to-one to the B available unlicensed bands in ascending order of sequence numbers. One block in FIG. 4b represents one bit. It is assumed that A=4, B=3, C=2, D=2, the sequence numbers of the unlicensed bands included in the unlicensed band set are 0, 1, 2, and 3, the sequence numbers of the unlicensed bands in the available unlicensed band set are 0, 2, and 3, sequence numbers of the two first unlicensed bands are 0 and 2, and a sequence number of the unlicensed band for sending the first indication information is 2 (as represented by using filled oblique lines in the figure). In this case, values of the bits shown in FIG. 4d are 110.

Figure 4E:
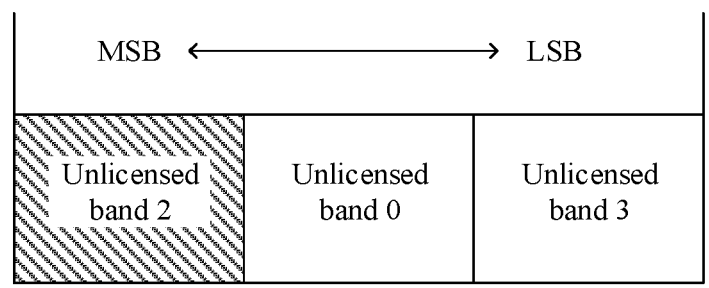
FIG. 4e is a schematic diagram of another correspondence between bits in a bitmap and unlicensed bands according to an embodiment of the present disclosure.

For another example (e.g., a manner 3-2), the first bit to a $B^{th}$ bit in the bitmap are in a direction from an MSB to an LSB in the bitmap. Starting from the MSB, the first bit corresponds to the unlicensed band for sending the first indication information. The second bit to the $B^{th}$ bit respectively correspond, in ascending (or descending) order of frequencies, priorities, or sequence numbers, one-to-one to unlicensed bands that are other than the unlicensed band for sending the first indication information and that are in the B available unlicensed bands. It may be understood that, alternatively, an LSB to an MSB in the bitmap may correspond to the B available unlicensed bands in a similar manner. FIG. 4e shows another example in which the MSB to the LSB respectively correspond to the B available unlicensed bands, and one block in FIG. 4e represents one bit. It is assumed that A=4, B=3, C=2, D=2, the sequence numbers of the unlicensed bands included in the unlicensed band set are 0, 1, 2, and 3, the sequence numbers of the unlicensed bands in the available unlicensed band set are 0, 2, and 3, sequence numbers of the two first unlicensed bands are 0 and 2, and a sequence number of the unlicensed band for sending the first indication information is 2 (as represented by using filled oblique lines in the figure). In this case, values of the bits shown in FIG. 4e are 110.

For another example (e.g., a manner 3-3), the first bit to a $B^{th}$ bit in the bitmap are in a direction from an MSB to an LSB in the bitmap. The first bit to an $x^{th}$ bit respectively correspond, in ascending (or descending) order of frequencies, priorities, or sequence numbers, one-to-one to x available unlicensed bands starting from the unlicensed band for sending the first indication information, where the $x^{th}$ bit corresponds to an available unlicensed band having a highest (or lowest) frequency, priority, or sequence number. An $(x+1)^{th}$ bit to the $B^{th}$ bit respectively correspond one-to-one to B-x available unlicensed bands in ascending order of frequencies, priorities, or sequence numbers. x is a positive integer, and is less than or equal to B. It may be understood that, alternatively, an LSB to an MSB in the bitmap may correspond to the B unlicensed bands in a similar manner. For example, it is assumed that A=4, B=3, C=2, and D=2, the sequence numbers of the unlicensed bands included in the unlicensed band set are 0, 1, 2, and 3, the sequence numbers of the unlicensed bands in the available unlicensed band set are 0, 2, and 3, sequence numbers of the two first unlicensed bands are 0 and 2, and a sequence number of the unlicensed band for sending the first indication information is 2. In this case, values of the bits in the bitmap are 101.

It may be understood that, the bits in the bitmap may alternatively correspond to the B available unlicensed bands in another order (e.g., in order from the LSB to the MSB). This is not limited in the present disclosure. It may be further understood that, the B available unlicensed bands may correspond to the bits (from the MSB to the LSB or from the LSB to the MSB) in the bitmap in another order. This is not limited in the present disclosure. A specific correspondence may be specified in a protocol, or may be notified to the terminal device by using control information sent by the network device.

In a fourth implementation (e.g., a manner 4) of the bitmap, the bitmap includes B-1 bits. The B-1 bits respectively correspond to B-1 unlicensed bands. The B-1 unlicensed bands are other than the first unlicensed band for sending the first indication information and are in the B available unlicensed bands. Values of the B-1 bits are used to indicate whether the corresponding unlicensed bands are the first unlicensed bands. Because a value of a bit representing the first unlicensed band for sending the first indication information is constantly 1, the bitmap does not need to include the bit corresponding to the first unlicensed band for sending the first indication information. Compared with signaling overheads in the manner 3, signaling overheads are smaller.

For example, a most significant bit (MSB) to a least significant bit (LSB) in the bitmap respectively correspond, in ascending order (or descending order) of frequencies, priorities, or sequence numbers, one-to-one to the unlicensed bands that are other than the unlicensed band for sending the first indication information and that are in the B available unlicensed bands. It may be understood that, alternatively, an LSB to an MSB in the bitmap may correspond to the B available unlicensed bands in a similar manner. FIG. 4d or FIG. 4e is used as an example. A difference between the manner 4 and the manner 3 is that the bitmap in the manner 4 does not include a bit corresponding to the unlicensed band 2 (as represented by using filled oblique lines in the figure). When a same assumption as that in the manner 3 is used, a value of the bitmap in the manner 4 is 10.

It may be understood that, alternatively, the bits in the bitmap may correspond to the B-1 available unlicensed bands in another order (e.g., in order from the LSB to the MSB). This is not limited in the present disclosure. It may be further understood that, the B-1 available unlicensed bands may correspond to bits (from the MSB to the LSB or from the LSB to the MSB) in the bitmap in another order. This is not limited in the present disclosure. A specific correspondence may be specified in a protocol, or may be notified to the terminal device by using control information sent by the network device.

Figure 4F:
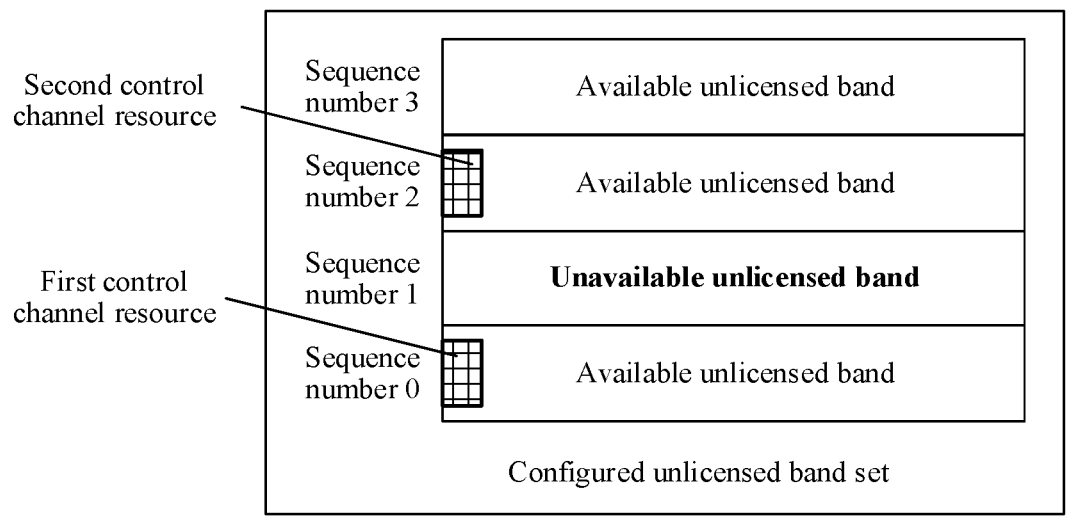
FIG. 4f is a schematic diagram of a scenario in which an available unlicensed band set and a control channel resource group are distributed according to an embodiment of the present disclosure.
Figure 4G:
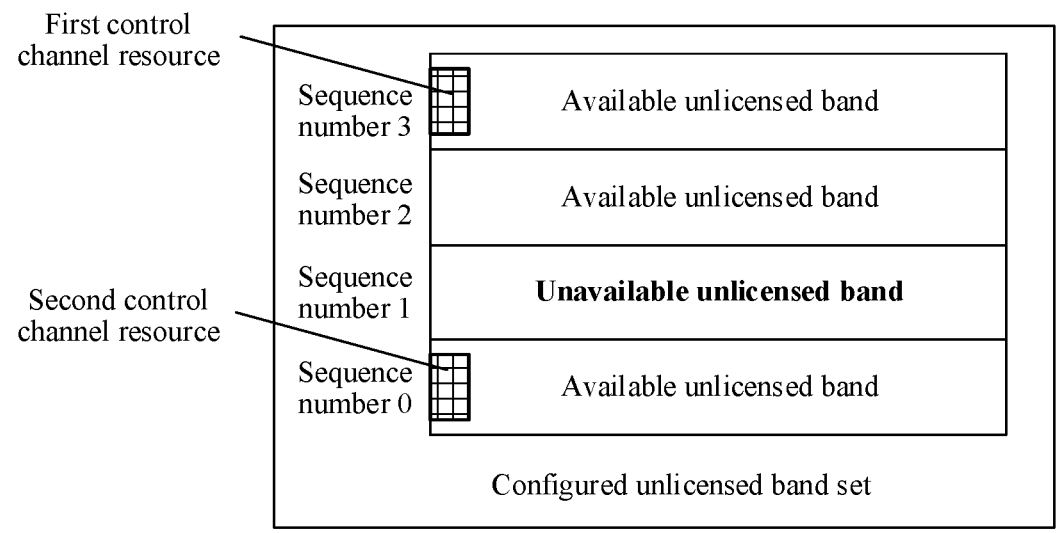
FIG. 4g is a schematic diagram of another scenario in which an available unlicensed band set and a control channel resource group are distributed according to an embodiment of the present disclosure.
Figure 4H:
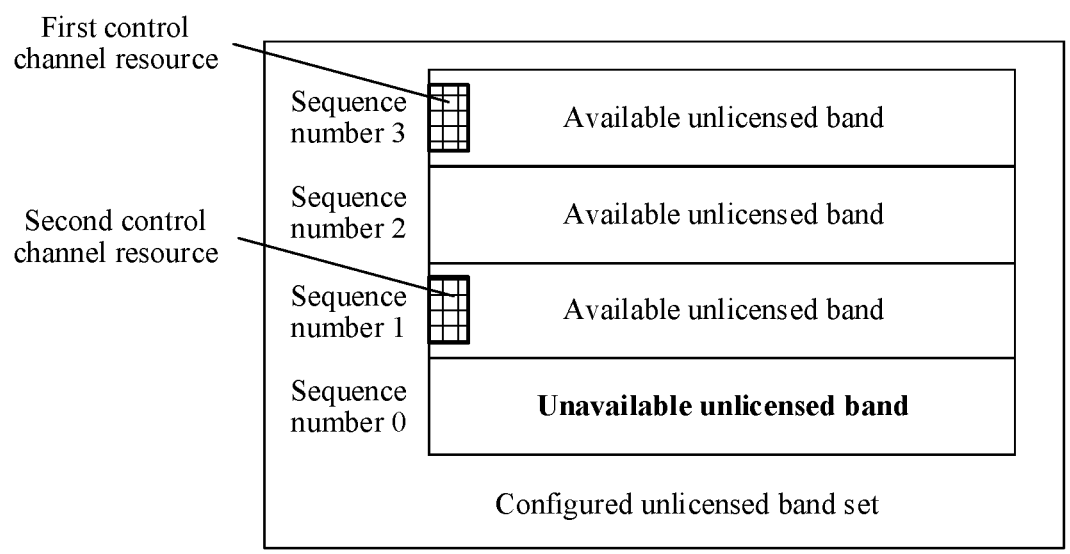
FIG. 4h is a schematic diagram of another scenario in which an available unlicensed band set and a control channel resource group are distributed according to an embodiment of the present disclosure.

It should be noted that, compared with another implementation, the manner 1-2 or the manner 2-2 can be used to reduce system complexity and improve utilization efficiency of an unlicensed band resource. Specific reasons include: (1) The quantity of the bits included in the bitmap in the manner 1-2 or the manner 2-2 is related only to a first unlicensed band set; (2) no matter which available unlicensed band is used to send the first indication information, the content (to be specific, the values of the bits in the bitmap) of the first indication information sent by the network device may remain unchanged. FIG. 4c is used as an example. It is assumed that A=4, C=2, and D=2. In this case, the values of the bits in the bitmap are 1100. That the values of the bits in the bitmap are 1100 may be applied to any scenario shown in FIG. 4f to FIG. 4h. In a scenario shown in FIG. 4f, the network device sends the bitmap by using an unlicensed band 0. In a scenario shown in FIG. 4g, the network device sends the bitmap by using an unlicensed band 3. In a scenario shown in FIG. 4h, the network device sends the bitmap by using an unlicensed band 3.

When the first indication information is a bitmap, in another implementation of this embodiment of the present disclosure, the network device first performs step S408, and then performs step S406. To be specific, the network device first sets a value of C and a value of the bitmap, and then determines B through listening. However, B<C. In this case, the terminal device ignores a bit whose value is 1 and that is after a $(B+1)^{th}$ bit and a $B^{th}$ bit in the bitmap. FIG. 4c is used as an example. When a value of the bitmap is 1100 and there is only one available unlicensed band (that is, B=1), for a scenario shown in any one of FIG. 4f to FIG. 4h, the terminal device may ignore the second bit (the second bit whose value is 1). In this way, it can be ensured that the network device and the terminal device have a consistent understanding. In this case, compared with another implementation, the manner 1-2 or the manner 2-2 can be used to reduce system complexity and improve utilization efficiency of an unlicensed band resource.

It may be understood that, the bitmap is not limited to the foregoing four implementations. It may be understood that, which specific implementation in the foregoing manner 1 to the manner 4 is used may be specified in a protocol, or may be notified by the network device to the terminal device by using a system message, an RRC message, a MAC layer message, or a physical layer message. This is not limited in the present disclosure.

From a perspective of a system, a quantity of unlicensed bands may be greater than a quantity A of unlicensed bands included in an unlicensed band set configured for one terminal device. Therefore, to further simplify a system design, a quantity of bits included in a bitmap may be a specified value greater than A. In this case, the terminal device only needs to consider bits that are in the bitmap and that correspond to the unlicensed bands in the unlicensed band set obtained in step S402. To be specific, the terminal device ignores a bit corresponding to an unlicensed band that does not belong to the unlicensed band set. Alternatively, in this case, the terminal device only needs to consider bits that are in the bitmap and that correspond to unlicensed bands that are other than the unlicensed band for sending the first indication information and that are in the unlicensed band set obtained in step S402. Alternatively, in this case, the terminal device only needs to consider bits that are in the bitmap and that correspond to the unlicensed bands in the available unlicensed band set obtained in step S406. Alternatively, in this case, the terminal device only needs to consider bits that are in the bitmap and that correspond to unlicensed bands that are other than the unlicensed band for sending the first indication information and that are in the available unlicensed band set obtained in step S406. For example, if a system supports simultaneously using a maximum of five unlicensed bands to serve the terminal device, the bitmap may include five bits. If for one terminal device, A=4, one bit such as the last bit (LSB) in the bitmap is unavailable for the terminal device. That is, the terminal device ignores the bit. It may be understood that, which bit or bits in the bitmap are ignored by the terminal device may be determined by defining a corresponding rule in a protocol or be notified by the network device to the terminal device.

In another implementation, the first indication information includes the sequence numbers (or the indexes or the identifiers) of the C first unlicensed bands. The sequence numbers (or the indexes or the identifiers) are the sequence numbers in the configuration information in step S402. For a specific description of the sequence numbers (or the indexes or the identifiers), refer to step S402. The terminal device may determine the C first unlicensed bands by using the C sequence numbers in the first indication information.

The first indication information may be sent by using RRC layer control information, MAC layer control information, or physical layer control information. This is not limited in the present disclosure. When the RRC layer control information is used, the first indication information may be a dedicated RRC message or a system broadcast message.

In an implementation, the transceiver 820 in the network device may be configured to send the first indication information. Alternatively, the processor 810 in the network device controls the transceiver 820 to send the first indication information.

In an implementation, the transceiver 920 in the terminal device may be configured to receive the first indication information. Alternatively, the processor 910 in the terminal device controls the transceiver 920 to receive the first indication information.

S410: The terminal device determines the C first unlicensed bands in the available unlicensed band set, where the first unlicensed band includes a control channel. To be specific, the first unlicensed band carries at least one of the D control channel resource groups.

When the first indication information is a bitmap, the terminal device determines the C first unlicensed bands based on the bitmap. When the first indication information includes the sequence numbers (or the indexes or the identifiers) of the C unlicensed bands, the terminal device determines the C first unlicensed bands based on the C sequence numbers.

In an implementation (e.g., a manner 1), an $i^{th}$ control channel resource group belongs to an $i^{th}$ first unlicensed band, where $1 \leq i \leq C$.

In another implementation (e.g., a manner 2), a $j^{th}$ control channel resource group belongs to a $(((j-1) \mod C)+1)^{th}$ first unlicensed band, where $1 \leq j \leq D$.

A specific implementation is the same as that of the network device. For details, refer to step S408. Details are not described herein again.

In an implementation, the processor 910 in the terminal device may be configured to determine the C first unlicensed bands.

S411: The network device communicates with the terminal device by using at least one unlicensed band in the available unlicensed band set.

The network device sends downlink control information to the terminal device by using a control channel resource set in the control channel resource group included in the first unlicensed band. The downlink control information includes downlink data resource information or uplink data resource information scheduled for the terminal device. Correspondingly, the terminal device receives, by using the control channel resource set in the control channel resource group included in the first unlicensed band, the downlink control information sent by the network device. The terminal device receives downlink data by using a downlink data resource notified in the downlink control information, or sends uplink data on an uplink data resource notified in the downlink control information.

It may be understood that, as described in step S404, the downlink control information used to indicate a data resource is transmitted on the first control channel resource set. When a data resource of the terminal device on the first unlicensed band conflicts with the control channel resource set included in the first unlicensed band, no data of the terminal device is transmitted on the conflicting resource.

In an implementation, the processor 810 and the transceiver 820 in the network device may be configured to complete communication.

In an implementation, the processor 910 and the transceiver 920 in the terminal device may be configured to complete communication.

It may be understood that, by performing step S401 to step S410 in this embodiment of the present disclosure, the network device and the terminal device may dynamically determine the first unlicensed band that carries the at least one of the D control channel resource groups. In this way, communication in step S411 is implemented. Therefore, step S411 is optional.

It may be understood that, the configuration information for indicating the unlicensed band set in step S402 and the second indication information in S404 may be sent by using different messages, or may be sent by using a same message. This is not limited in the present disclosure.

It may be understood that, an execution sequence of the steps in this embodiment of the present disclosure is not limited, and any sequence that can achieve the objective of this embodiment of the present disclosure falls within the protection scope of the present disclosure. The network device and the terminal device perform the method according to this embodiment of the present disclosure. Although the unlicensed band included in the available unlicensed band set changes continuously with time, the network device and the terminal device may dynamically determine the first unlicensed band that carries the at least one of the D control channel resource groups, that is, determine a position of the control channel. In this way, normal communication is implemented. This avoids a problem that normal communication cannot be performed because an unlicensed band to which a semi-statically configured control channel resource belongs is unavailable.

Figure 5:
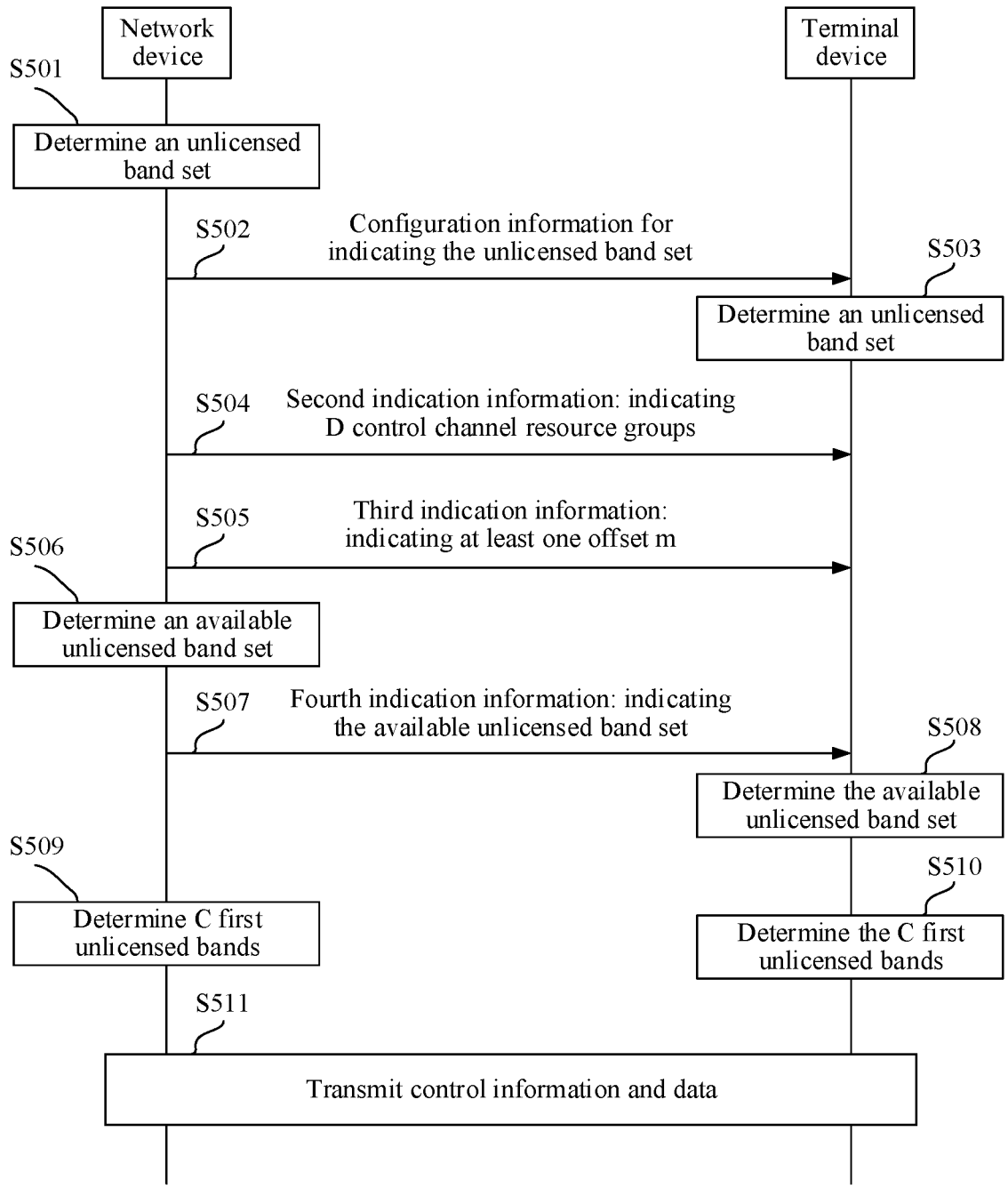
FIG. 5 is a schematic diagram of another control channel position determining procedure according to an embodiment of the present disclosure.

FIG. 5 is a schematic flowchart of another control channel position determining method according to an embodiment of the present disclosure.

In this embodiment of the present disclosure, S501 to S504 are respectively the same as S401 to S404, and details are not described herein again.

S505: The network device sends third indication information to the terminal device. Correspondingly, the terminal device receives the third indication information. The third indication information is used to indicate at least one offset m, where m is a natural number, and $0 \leq m \leq A$. When a quantity of the at least one offset m is greater than 1, each offset m corresponds to at least one of the D control channel resource groups. To be specific, in this case, the at least one of the D control channel resource groups corresponds to only one m. For example, the first control channel resource group uses m1, the second control channel resource group uses m2, and the third control channel resource group uses m1. Both m1 and m2 are natural numbers. In addition, $0 \leq m1 < A$, and $0 \leq m2 < A$. In a special case, D1 first control channel resource groups in the D control channel resource groups may correspond to m1, and D-D1 second control channel resource groups in the D control channel resource groups may correspond to m2.

The terminal device determines the first unlicensed band based on the at least one m. The first unlicensed band carries at least one of the D control channel resource groups. Alternatively, the terminal device determines, based on the at least one m, a first unlicensed band to which at least one of the first to a $D^{th}$ control channel resource groups belongs.

The third indication information and the second indication information may be carried in a same message or a same piece of signaling, or may be carried in different messages or signaling. Alternatively, the third indication information and the configuration information for indicating the unlicensed band set may be carried in a same message or a same piece of signaling, or may be carried in different messages or signaling. Alternatively, the third indication information, the second indication information, and the configuration information for indicating the unlicensed band set may be carried in a same message or a same piece of signaling, or may be carried in different messages or signaling.

The third indication information may be sent by using RRC layer control information, MAC layer control information, or physical layer control information. This is not limited in the present disclosure. When the RRC layer control information is used, the third indication information may be a dedicated RRC message or a system broadcast message.

In an alternative implementation, the third indication information in step S505 is specified in a protocol. That is, in this case, step S505 does not exist.

In an implementation, the transceiver 820 in the network device is configured to send the third indication information. Alternatively, the processor 810 in the network device controls the transceiver 820 to send the third indication information.

In an implementation, the transceiver 920 in the terminal device may be configured to receive the third indication information. Alternatively, the processor 910 in the terminal device controls the transceiver 920 to receive the third indication information. S506: The network device determines an available unlicensed band set. S506 is the same as S405, and details are not described again.

S506: The network device determines the available unlicensed band set. S506 is the same as S405, and details are not described again.

S507: The network device sends fourth indication information to the terminal device, where the fourth indication information is used to indicate the available unlicensed band set or an available unlicensed band. S507 is the same as S406, and details are not described again.

S508: The terminal device determines the available unlicensed band set. S508 is the same as S407, and details are not described again.

S509: The network device determines C first unlicensed bands in the available unlicensed band set, where the first unlicensed band includes a control channel, and C is a positive integer.

When $m \leq B$, the network device determines, based on the at least one offset m, that the C first unlicensed bands include an $(m+1)^{th}$ unlicensed band in the available unlicensed band set. Because the network device determines m before determining B available unlicensed bands, that $m \geq B$ may occur. In this case, the network device determines, based on the at least one offset m, that the C first unlicensed bands include an $((m+1) \bmod B)^{th}$ unlicensed band in the available unlicensed band set. The $((m \bmod B)+1)^{th}$ unlicensed band is an $((m \bmod B)+1)^{th}$ unlicensed band in the B available unlicensed bands in ascending order of frequencies or sequence numbers; or the $((m \bmod B)+1)^{th}$ unlicensed band is an $((m \bmod B)+1)^{th}$ unlicensed band in the B unlicensed bands in descending order of frequencies or sequence numbers. For a description of information about the frequencies or the sequence numbers, refer to step S502. It may be understood that, regardless of whether $m \leq B$, or $m \geq B$, the network device may determine, based on the at least one offset m, that the C first unlicensed bands include the $((m+1) \bmod B)^{th}$ unlicensed band in the available unlicensed band set. For example, assuming that m=1, and B=4, the C first unlicensed bands include the $((m \bmod B)+1)^{th}$ available unlicensed band, namely, the second available unlicensed band. For another example, assuming that m=4, and B=2, the C first unlicensed bands include the $((m \bmod B)+1)^{th}$ available unlicensed band, namely, the first available unlicensed band.

In an implementation (e.g., a manner 1), a $j^{th}$ control channel resource group belongs to a $(((j+m-1) \bmod B)+1)^{th}$ available unlicensed band, where $1 \leq j \leq D$. The first to the $D^{th}$ control channel resource groups are in ascending order of sequence numbers or priorities; or the first to the $D^{th}$ control channel resource groups are in descending order of sequence numbers or priorities. When $D \leq B$, the determined C first unlicensed bands include D unlicensed bands in the available unlicensed band set. That is, C=D. When $D \geq B$, the determined C first unlicensed bands include B unlicensed bands in the available unlicensed band set. In this case, the network device may determine that all the B available unlicensed bands are first unlicensed bands. That is, C=B. For example, assuming that D=4, to be specific, the second indication information includes four control channel resource groups, m=1, and B=3, the first control channel resource group belongs to the $(((j+m-1) \bmod B)+1)^{th}$ available unlicensed band, namely, the second available unlicensed band. The second control channel resource group belongs to the $(((j+m-1) \bmod B)+1)^{th}$ available unlicensed band, namely, the third available unlicensed band. The third control channel resource group belongs to the $(((j+m-1) \bmod B)+1)^{th}$ available unlicensed band, namely, the first available unlicensed band. The fourth control channel resource group belongs to the $(((j+m-1) \bmod B)+1)^{th}$ available unlicensed band, namely, the second available unlicensed band.

In the manner 1, first unlicensed bands to which all the control channel resource groups belong can be determined, but it is possible that a plurality of control channel resource groups belong to a same first unlicensed band. Therefore, resources of the plurality of control channel resource groups may conflict (or resources of control channel resource sets included in the plurality of control channel resource groups may conflict). In this case, some or all of the plurality of conflicting control channel resource groups are considered as unavailable (or the plurality of conflicting control channel resource sets are considered as unavailable). Specifically, a control channel resource group having a lower (or higher) sequence number or priority in the plurality of conflicting control channel resource groups is considered unavailable. To be specific, in this case, a control channel resource set in the control channel resource group is not used to transmit downlink control information of the terminal device. For another example, a control channel resource set that is in a control channel resource group having a lower (or higher) sequence number or priority and that is in the plurality of conflicting control channel resource sets is not used to transmit downlink control information of the terminal device.

Another implementation (e.g., a manner 2) is based on the implementation 1. Different from the manner 1, a $(j+1)^{th}$ to the $D^{th}$ control channel resource groups do not belong to any one of the B available unlicensed bands. j meets the following condition: $((j+m-1) \mod B)+1=B$. For example, it is assumed that D=4, to be specific, the second indication information includes four control channel resource groups, m=1, and B=3. After the first unlicensed bands to which the first and the second control channel resource groups belong are determined, that is, when j=2, $((j+m-1) \mod B)+1=3=B$. In this case, the third control channel resource group to the third control channel resource group do not belong to any unlicensed band. The manner 2 is simple, but may limit a quantity of available control channel resource groups.

Another implementation (e.g., a manner 3) is based on the implementation 1. Different from the manner 1, a $(j+1)^{th}$ to the $D^{th}$ control channel resource groups do not belong to any one of the B available unlicensed bands. j meets the following condition: j=B. For example, it is assumed that D=4, to be specific, the second indication information includes four control channel resource groups, m=1, and B=3. After the first unlicensed bands to which the first and the second control channel resource groups belong are determined, that is, when j=2, $((j+m-1) \mod B)+1=3$. The first unlicensed band to which the third control channel resource group belongs is the $(((j+m-1) \mod B)+1)^{th}$ available unlicensed band, namely, the first available unlicensed band. That is, the third control channel resource group belongs to the first available unlicensed band. In this case, j=B. Therefore, the fourth control channel resource group does not belong to any unlicensed band. Compared with the control channel resource groups in the manner 2, more control channel resource groups may be available. However, a case in which the plurality of control channel resource groups belong to the same first unlicensed band and that is in the manner 1 does not occur.

In the foregoing manner 1, the manner 2, and the manner 3, when j>1, that the $j^{th}$ control channel resource group belongs to the $(((j+m-1) \mod B)+1)^{th}$ available unlicensed band may be replaced with that the $j^{th}$ control channel resource group belongs to a $(((j+m-1+x) \mod B)+1)^{th}$ available unlicensed band, where $1 \leq j \leq D$, and x is a natural number. In other words, the network device may determine an included control channel resource group at an interval of X unlicensed bands. For example, it is assumed that D=2, m=1, B=3, and x=1. The network device determines that the first (that is, j=1) control channel resource group belongs to the $(((j+m-1) \mod B)+1)^{th}$ available unlicensed band, namely, the second available unlicensed band. The network device determines that the second (that is, j=2) control channel resource group belongs to the $(((j+m-1+x) \mod B)+1)^{th}$ available unlicensed band, namely, the first available unlicensed band. x may be specified in a protocol, or may be sent by using RRC layer control information, MAC layer control information, or physical layer control information. This is not limited in the present disclosure. The RRC layer control information may be a dedicated RRC message or a system broadcast message.

When a quantity of m is greater than 1, in the foregoing manner 1, manner 2, and manner 3, that the $j^{th}$ control channel resource group belongs to the $(((j+m-1) \mod B)+1)^{th}$ available unlicensed band, where $1 \leq j \leq D$ may be replaced with that a $j^{th}$ control channel resource group corresponding to m belongs to the $(((j+m-1) \mod B)+1)^{th}$ available unlicensed band, where $1 \leq j \leq D$.

Specifically, which specific manner in the manner 1, the manner 2, or the manner 3 is used may be specified in a protocol, or may be notified by the network device to the terminal device by using an RRC layer message, a MAC layer message, or a physical layer message. When the RRC layer message is used for notification, the RRC layer message may be a system message or a dedicated RRC message. This is not limited in the present disclosure.

When the third indication information is specified in a protocol, step S509 may alternatively be implemented according to an implementation of the manner 1 and/or the manner 2 in step S408. For example, it is assumed that the unlicensed band set includes unlicensed bands 0, 1, 2, and 3, that is, A=4, the available unlicensed band set includes the unlicensed bands 0, 2, and 3, that is, B=3, C=2, and D=2. The first control channel resource group belongs to the unlicensed band 0, and the second control channel resource group belongs to the unlicensed band 2. When D<B, the D control channel resource groups correspond one-to-one to D of the B available unlicensed bands in ascending order of frequencies or sequence numbers.

In an implementation, the processor 810 in the network device may be configured to determine the C first unlicensed bands.

S510: The terminal device determines the C first unlicensed bands in the available unlicensed band set, where the first unlicensed band includes the control channel.

The terminal device determines the C first unlicensed bands based on the fourth indication information and the at least one offset m in the third indication information.

The operation of the terminal device in this step corresponds to the operation of the network device in S509, to ensure that the terminal device and the network side device have a consistent understanding. For details, refer to step S509.

In an implementation, the processor 910 in the terminal device may be configured to determine the C first unlicensed bands.

S511: The network device communicates with the terminal device by using at least one unlicensed band in the available unlicensed band set. S511 is the same as S411, and details are not described again.

It may be understood that, an execution sequence of the steps in this embodiment of the present disclosure is not limited, and any sequence that can achieve the objective of this embodiment of the present disclosure falls within the protection scope of the present disclosure.

The network device and the terminal device perform the method according to this embodiment of the present disclosure. Although the unlicensed band included in the available unlicensed band set changes continuously with time, the network device and the terminal device may dynamically determine the first unlicensed band that carries the at least one of the D control channel resource groups, that is, determine a position of the control channel. In this way, normal communication is implemented. This avoids a problem that normal communication cannot be performed because an unlicensed band to which a semi-statically configured control channel resource belongs is unavailable.

An embodiment of another control channel position determining method according to the present disclosure includes the following steps.

S601 to S608 are respectively the same as S401 to S408, and details are not described herein again.

S609: The network device sends fifth indication information to the terminal device. Correspondingly, the terminal device receives the fifth indication information. The fifth indication information is used to indicate the determined C first unlicensed bands.

A method for sending the fifth indication information is the same as the method for sending the first indication information in step 409, and details are not described again.

In an implementation, the fifth indication information includes the at least one of the D control channel resource groups and information about the first unlicensed band to which the at least one of the D control channel resource groups belongs. For example, the fifth indication information includes: the first control channel resource group, where the first control channel resource group belongs to an available unlicensed band 1 (or a sequence number of an available unlicensed band is 1); and the second control channel resource group, where the second control channel resource group belongs to an available unlicensed band 3 (or a sequence number of an available unlicensed band is 3).

For another example, the fifth indication information includes:

the first control channel resource group, where the first control channel resource group belongs to the first unlicensed band (a sequence number of an unlicensed band is 1); and the second control channel resource group, where the second control channel resource group belongs to the third unlicensed band (a sequence number of an unlicensed band is 3).

In another implementation, the fifth indication information may include only sequence number information of an unlicensed band. In this case, the first control channel resource group belongs to an unlicensed band corresponding to an unlicensed band sequence number that occurs first in the fifth indication information, the second control channel resource group belongs to an unlicensed band corresponding to an unlicensed band sequence number that occurs second in the fifth indication information, and so on. A same sequence number may occur two or more times. In this case, unlicensed bands corresponding to the sequence number include a plurality of control channel resource groups. Compared with signaling overheads in the first implementation, signaling overheads of the fifth indication information is lower.

In a third implementation, the fifth indication information may include only one first sequence number. An unlicensed band corresponding to the first sequence number includes the first control channel resource group. Then, the second to the $D^{th}$ control channel resource groups belong to available unlicensed bands determined in ascending (or descending) order of sequence numbers starting from the first sequence number. In this case, the first sequence number has a same function as the offset m in Embodiment 5. A specific implementation is similar to S506 in Embodiment 5, and details are not described herein again.

In a fourth implementation, the fifth indication information may be a reference signal. The reference signal used for the fifth indication information is different from the reference signal used for the fourth indication information. The network device sends the fifth indication information (namely, the reference signal) on all available unlicensed bands including control channel resource groups. In all the available unlicensed bands (namely, first unlicensed bands) for sending the fifth indication information (namely, the reference signal), an available unlicensed band having a lowest (or highest) sequence number or frequency includes the first control channel resource group. The $i^{th}$ control channel resource group belongs to an $i^{th}$ available unlicensed band for sending the fifth indication information. The first to a $C^{th}$ unlicensed bands for sending the fifth indication information are in ascending order of frequencies or sequence numbers; the first to a $C^{th}$ unlicensed bands for sending the fifth indication information are in descending order of frequencies or sequence numbers. The reference information may be a cell-specific reference signal (CRS). The CRS is a reference signal that can be identified by all terminal devices accessing the network device, or a terminal-specific reference signal (UE-Specific Reference signal). The reference signal includes but is not limited to a CSI-RS, a DM-RS, and a reference signal, for example, a DMRS used for a PDSCH, a phase tracking reference signal PT-RS used for a PDSCH, a DMRS used for a PDCCH, a DMRS used for a physical broadcast channel, and a synchronization signal, used in an NR system.

In an implementation, the transceiver 820 in the network device may be configured to send the fifth indication information. Alternatively, the processor 810 in the network device controls the transceiver 820 to send the fifth indication information.

In an implementation, the transceiver 920 in the terminal device receives the fifth indication information. Alternatively, the processor 910 in the network device controls the transceiver 920 to send the fifth indication information.

S610: The terminal device determines the C first unlicensed bands in the available unlicensed band set, where the first unlicensed band includes the control channel.

Specifically, the terminal device determines the C first unlicensed bands based on the fifth indication information and the fourth indication information.

The operation of the terminal device in this step corresponds to the operation of the network device in S608, to ensure that the terminal device and the network side device have a consistent understanding. For details, refer to step S609.

In an implementation, the processor 910 in the terminal device may be configured to determine the C first unlicensed bands.

The network device and the terminal device perform the method according to this embodiment of the present disclosure. Although the unlicensed band included in the available unlicensed band set changes continuously with time, the network device and the terminal device may dynamically determine the first unlicensed band that carries the at least one of the D control channel resource groups, that is, determine a position of the control channel. In this way, normal communication is implemented. This avoids a problem that normal communication cannot be performed because an unlicensed band to which a semi-statically configured control channel resource belongs is unavailable.

Figure 6:
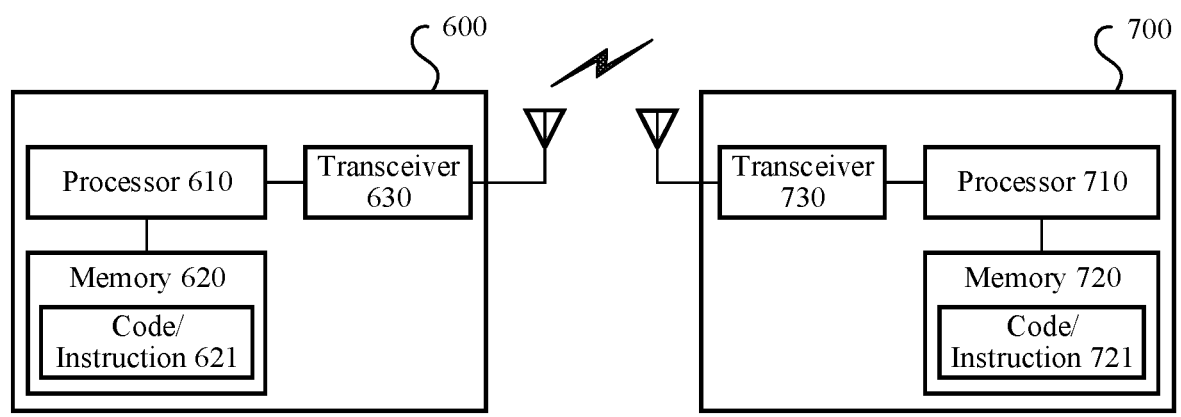
FIG. 6 is a possible schematic structural diagram of another wireless apparatuses according to an embodiment of this application.

FIG. 6 is a schematic block diagram of another wireless apparatus 600 and another wireless apparatus 700 that are for implementing the embodiments of the present disclosure.

The wireless apparatus 600 may be the network device 101 in the foregoing embodiments of the present disclosure, or a component in the network device 101. The wireless apparatus 600 includes a processor 610, a transceiver 630, and a memory 620. The memory 620 is configured to store program code or an instruction that can be executed by a computer or the processor 610. The transceiver 630 is configured to send and receive a signal. The signal may be an analog radio frequency signal, a digital radio frequency signal, or a radio signal. The processor 610 reads and executes the program code or the instruction in the memory 620. When the program code or the instruction in the memory 620 is executed by the processor 610, the processor 610 controls the wireless apparatus 600 to implement the functions of the network device in the foregoing methods.

The wireless apparatus 700 may be either of the terminal devices 111 and 112 in the foregoing embodiments of the present disclosure, or a component in either of the terminal devices 111 and 112. The wireless apparatus 700 includes a processor 710, a transceiver 730, and a memory 720. The memory 720 is configured to store computer-executable program code or a computer-executable instruction. The transceiver 730 is configured to send and receive a signal. The signal may be an analog radio frequency signal, a digital radio frequency signal, or a radio signal. The processor 710 reads and executes the program code or the instruction in the memory 720. When the program code or the instruction in the memory 720 is executed by the processor 610, the processor 710 controls the wireless apparatus 700 to implement the functions of the terminal device in the foregoing methods.

It may be understood that, FIG. 6 shows only a simplified design of the wireless apparatuses 600 and 700. During actual application, the wireless apparatuses 600 and 700 may include any quantity of transceivers, processors, memories, and the like, and all structures that can implement the present disclosure fall within the protection scope of the present disclosure.

An example of the present disclosure further provides an apparatus (e.g., an integrated circuit (IC), a wireless device, or a circuit module), configured to implement the foregoing methods. The apparatus described in this specification may be implemented by an independent device or a part of a relatively large device. The device may be: (i) an independent IC, (ii) a set of one or more ICs, where the set may include a memory IC configured to store data and/or an instruction, (iii) a radio frequency IC (RFIC) such as an RF receiver or an RF transmitter/receiver, (iv) an application specific IC (ASIC) such as a mobile station modem, (v) a module that can be embedded in another device, (vi) a receiver, a cellular phone, a wireless device, a hand-held phone, or a mobile unit, or (vii) others.

The methods and the apparatuses provided in the embodiments of the present disclosure may be applied to a terminal device or a network device (which may be collectively referred to as a wireless device). The terminal device or the network device or the wireless device may include a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing by using a process, for example, a Linux operating system, a Unix operating system, an Android operating system, an iOS operating system, or a Windows operating system. The application layer includes applications such as a browser, an address book, text processing software, and instant messaging software. In addition, in the embodiments of the present disclosure, a specific structure of an execution body of the method is not limited in the embodiments of the present disclosure, provided that the execution body can perform communication according to the signal transmission method in the embodiments of the present disclosure by running a program that records code of the method in the embodiments of the present disclosure. For example, the wireless communication method in the embodiments of the present disclosure may be performed by the terminal device or the network device, or a function module that is in the terminal device or the network device and that can invoke and execute a program.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (e.g., a coaxial cable, an optical fiber, or a digital subscriber line (DSL)) or wireless (e.g., infrared, radio, or microwave) manner. The computer-readable storage medium may be any usable medium accessible by a computer, or a data storage device, such as a server or a data center, integrating one or more usable media. The usable medium may be a magnetic medium (e.g., a floppy disk, a hard disk, or a magnetic tape), an optical medium (e.g., a DVD), a semiconductor medium (e.g., a solid-state drive Solid State Disk (SSD)), or the like.

It should be understood that, sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that, the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

When the functions are implemented in the form of a software functional unit and sold or used as an independent product, the functions may be stored in a computer-readable storage medium. Based on such an understanding, the technical solutions in the embodiments of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods in the various embodiments of the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the embodiments of the present disclosure, but are not intended to limit the protection scope of the embodiments of the present disclosure. Any variation or replacement readily figured out by a person skilled in the art within the technical scope disclosed in the embodiments of the present disclosure shall fall within the protection scope of the embodiments of the present disclosure.

What is claimed is:

1. A control channel position determining method, comprising:
   determining an unlicensed band set, wherein the unlicensed band set comprises A unlicensed bands;
   determining an available unlicensed band set, wherein the available unlicensed band set comprises B unlicensed bands, and the available unlicensed band set is a subset of the unlicensed band set;
   determining C first unlicensed bands in the available unlicensed band set, wherein the C first unlicensed bands comprise a control channel, and A, B and C are all positive integers;
   sending first indication information to a terminal device, wherein the first indication information is used to indicate the determined C first unlicensed bands; and
   sending second indication information to the terminal device, wherein the second indication information is used to indicate D control channel resource groups, each of the control channel resource groups comprises one or more control channel resource sets, and D is a positive integer,
   wherein the determining C first unlicensed bands in the available unlicensed band set comprises:
   determining, in the available unlicensed band set, a control channel resource group comprised in each of the C first unlicensed bands, wherein:
   an $i^{th}$ control channel resource group belongs to an $i^{th}$ first unlicensed band, and $1 \leq i \leq C$, or a $j^{th}$ control channel resource group belongs to a $(((j-1) \bmod C)+1)^{th}$ first unlicensed band, and $1 \leq j \leq D$.

2. The method according to claim 1, wherein sending the first indication information to the terminal device comprises:
   sending the first indication information to the terminal device by using a licensed band;
   sending the first indication information to the terminal device by using at least one unlicensed band in the available unlicensed band set; or
   sending the first indication information to the terminal device by using at least one of the determined C first unlicensed bands.

3. The method according to claim 2, wherein:
   the first indication information is a bitmap, the bitmap comprises A bits, the A bits in the bitmap correspond to the A unlicensed bands, and a value of each of the A bits is used to indicate whether a corresponding unlicensed band is included in the C first unlicensed bands;
   the first indication information is a bitmap, the bitmap comprises B bits, the B bits in the bitmap correspond to the B available unlicensed bands, and a value of each of the B bits is used to indicate whether a corresponding unlicensed band is included in the C first unlicensed bands;
   the first indication information is a bitmap, the bitmap comprises A-1 bits, the A-1 bits in the bitmap correspond to A-1 unlicensed bands, the A-1 unlicensed bands are unlicensed bands that are other than a first unlicensed band for sending the first indication information and that are in the A unlicensed bands, and a value of each of the A-1 bits is used to indicate whether a corresponding unlicensed band is included in the C first unlicensed bands; or
   the first indication information is a bitmap, the bitmap comprises B-1 bits, the B-1 bits in the bitmap correspond to B-1 available unlicensed bands, the B-1 available unlicensed bands are available unlicensed bands that are other than a first unlicensed band for sending the first indication information and that are in the B available unlicensed bands, and a value of each of the B-1 bits is used to indicate whether a corresponding unlicensed band is included in the C first unlicensed bands.

4. The method according to claim 1, wherein:
   the first to a $D^{th}$ control channel resource groups are in ascending order of sequence numbers or priorities or the first to a $D^{th}$ control channel resource groups are in descending order of sequence numbers or priorities; and
   the first to a $C^{th}$ first unlicensed bands are in ascending order of frequencies or sequence numbers, or the first to a $C^{th}$ first unlicensed bands are in descending order of frequencies or sequence numbers, the first to a $C^{th}$ first unlicensed bands are in order from an unlicensed band corresponding to a most significant bit in the bitmap to an unlicensed band corresponding to a least significant bit in the bitmap, or the first to a $C^{th}$ first unlicensed bands are in order from an unlicensed band corresponding to a least significant bit in the bitmap to an unlicensed band corresponding to a most significant bit in the bitmap.

5. The method according to claim 1, wherein the method further comprises:

sending third indication information to a terminal device, wherein the third indication information is used to indicate at least one offset m, and m is a natural number, wherein:

the determined C first unlicensed bands comprise an $((m+1) \mod B)^{th}$ unlicensed band in the available unlicensed band set; and the $((m \mod B)+1)t^{th}$ unlicensed band is an $((m \mod B)+1)^{th}$ unlicensed band in the B unlicensed bands in ascending order of frequencies or sequence numbers; or the $((m \mod B)+1)^{th}$ unlicensed band is an $((m \mod B)+1)^{th}$ unlicensed band in the B unlicensed bands in descending order of frequencies or sequence numbers.

6. The method according to claim 5, wherein:

when D<B, the determined C first unlicensed bands comprise D unlicensed bands in the available unlicensed band set or when D≥B, the determined C first unlicensed bands comprise the B unlicensed bands in the available unlicensed band set; a $j^{th}$ control channel resource group belongs to a $(((j+m-1) \mod B)+1)^{th}$ available unlicensed band, and $1 \leq j \leq D$; and the first to a $D^{th}$ control channel resource groups are in ascending order of sequence numbers or priorities or the first to a $D^{th}$ control channel resource groups are in descending order of sequence numbers or priorities.

7. The method according to claim 1, wherein the method further comprises:

receiving, at a terminal device by using a licensed band, first indication information sent by a network device, wherein the first indication information is used to indicate the determined C first unlicensed bands;

receiving, at a terminal device by using at least one unlicensed band in the available unlicensed band set, first indication information sent by a network device, wherein the first indication information is used to indicate the determined C first unlicensed bands; or receiving, at a terminal device by using at least one of the determined C first unlicensed bands, first indication information sent by a network device, wherein the first indication information is used to indicate the determined C first unlicensed bands.

8. The method according to claim 7, wherein:

the first indication information is a bitmap, the bitmap comprises A bits, the A bits in the bitmap correspond to the A unlicensed bands, and a value of each of the A bits is used to indicate whether a corresponding unlicensed band is included in the C first unlicensed bands;

the first indication information is a bitmap, the bitmap comprises B bits, the B bits in the bitmap correspond to the B available unlicensed bands, and a value of each of the B bits is used to indicate whether a corresponding unlicensed band is included in the C first unlicensed bands;

the first indication information is a bitmap, the bitmap comprises A-1 bits, the A-1 bits in the bitmap correspond to A-1 unlicensed bands, the A-1 unlicensed bands are unlicensed bands that are other than a first unlicensed band for sending the first indication information and that are in the A unlicensed bands, and a value of each of the A-1 bits is used to indicate whether a corresponding unlicensed band is included in the C first unlicensed bands; or the first indication information is a bitmap, the bitmap comprises B-1 bits, the B-1 bits in the bitmap correspond to B-1 available unlicensed bands, the B-1 available unlicensed bands are available unlicensed bands that are other than a first unlicensed band for sending the first indication information and that are in the B available unlicensed bands, and a value of each of the B-1 bits is used to indicate whether a corresponding unlicensed band is included in the C first unlicensed bands.

9. The method according to claim 7, wherein the determining C first unlicensed bands in the available unlicensed band set comprises:

determining, in the available unlicensed band set, a control channel recourse group comprised in each of the C first unlicensed bands, wherein:

an $i^{th}$ control channel resource group belongs to an $i^{th}$ first unlicensed band, and $1 \leq i \leq C$ or a $j^{th}$ control channel resource group belongs to a $(((j-1) \mod C)+1)^{th}$ first unlicensed band, and $1 \leq j \leq D$.

10. The method according to claim 9, wherein:

the first to a $D^{th}$ control channel resource groups are in ascending order of sequence numbers or priorities or the first to a $D^{th}$ control channel resource groups are in descending order of sequence numbers or priorities; and the first to a $C^{th}$ first unlicensed bands are in ascending order of frequencies or sequence numbers, the first to a $C^{th}$ first unlicensed bands are in descending order of frequencies or sequence numbers, the first to a $C^{th}$ first unlicensed bands are in order from an unlicensed band corresponding to a most significant bit in the bitmap to an unlicensed band corresponding to a least significant bit in the bitmap, or the first to a $C^{th}$ first unlicensed bands are in order from an unlicensed band corresponding to a least significant bit in the bitmap to an unlicensed band corresponding to a most significant bit in the bitmap.

11. The method according to claim 1, wherein the method further comprises:

receiving third indication information sent by a network device, wherein the third indication information is used to indicate at least one offset m, and m is a natural number, wherein:

the determined C first unlicensed bands comprise an $((m \mod B)+1)^{th}$ unlicensed band in the available unlicensed band set; and the $((m \mod B)+1)^{th}$ unlicensed band is an $((m \mod B)+1)^{th}$ unlicensed band in the B unlicensed bands in ascending order of frequencies or sequence numbers or the $((m \mod B)+1)^{th}$ unlicensed band is an $((m \mod B)+1)^{th}$ unlicensed band in the B unlicensed bands in descending order of frequencies or sequence numbers.

12. The method according to claim 11, wherein:

when D<B, the determined C first unlicensed bands comprise D unlicensed bands in the available unlicensed band set or when D≥B, the determined C first unlicensed bands comprise the B unlicensed bands in the available unlicensed band set;

a $j^{th}$ control channel resource group belongs to a $(((j+m-1) \mod B)+1)^{th}$ available unlicensed band, and $1 \leq j \leq D$; and the first to a $D^{th}$ control channel resource groups are in ascending order of sequence numbers or priorities or the first to a $D^{th}$ control channel resource groups are in descending order of sequence numbers or priorities.

13. A wireless communications apparatus, comprising a processor and a transceiver coupled to the processor, wherein:

the processor is configured to determine an unlicensed band set, and the unlicensed band set comprises A unlicensed bands, the processor is further configured to determine an available unlicensed band set, wherein the available unlicensed band set comprises B unlicensed bands, and the available unlicensed band set is a subset of the unlicensed band set, the processor is further configured to determine C first unlicensed bands in the available unlicensed band set, wherein the C first unlicensed bands comprise a control channel, and A, B and C are all positive integers;

the transceiver is configured to send first indication information to a terminal device, wherein the first indication information is used to indicate the determined C first unlicensed bands, and the transceiver is further configured to send second indication information to the terminal device, wherein the second indication information is used to indicate D control channel resource groups, each of the control channel resource groups comprises one or more control channel resource sets, and D is a positive integer, wherein:

the processor is configured to determine, in the available unlicensed band set, a control channel resource group comprised in each of the C first unlicensed bands, wherein:

an $i^{th}$ control channel resource group belongs to an $i^{th}$ first unlicensed band, and $1 \leq i \leq C$, or a $j^{th}$ control channel resource group belongs to a $(((j-1) \bmod C)+1)^{th}$ first unlicensed band, and $1 \leq j \leq D$.

14. The wireless communications apparatus according to claim 13, wherein:

the transceiver is configured to send the first indication information to the terminal device by using a licensed band;

the transceiver is configured to send the first indication information to the terminal device by using at least one unlicensed band in the available unlicensed band set; or the transceiver is configured to send the first indication information to the terminal device by using at least one of the determined C first unlicensed bands.

15. The wireless communications apparatus according to claim 14, wherein:

the first indication information is a bitmap, the bitmap comprises A bits, the A bits in the bitmap correspond to the A unlicensed bands, and a value of each of the A bits is used to indicate whether a corresponding unlicensed band is included in the C first unlicensed bands;

the first indication information is a bitmap, the bitmap comprises B bits, the B bits in the bitmap correspond to the B available unlicensed bands, and a value of each of the B bits is used to indicate whether a corresponding unlicensed band is included in the C first unlicensed bands;

the first indication information is a bitmap, the bitmap comprises A-1 bits, the A-1 bits in the bitmap correspond to A-1 unlicensed bands, the A-1 unlicensed bands are unlicensed bands that are other than a first unlicensed band for sending the first indication information and that are in the A unlicensed bands, and a value of each of the A-1 bits is used to indicate whether a corresponding unlicensed band is included in the C first unlicensed bands; or the first indication information is a bitmap, the bitmap comprises B-1 bits, the B-1 bits in the bitmap correspond to B-1 available unlicensed bands, the B-1 available unlicensed bands are available unlicensed bands that are other than a first unlicensed band for sending the first indication information and that are in the B available unlicensed bands, and a value of each of the B-1 bits is used to indicate whether a corresponding unlicensed band is included in the C first unlicensed bands.

16. The wireless communications apparatus according to claim 13, wherein:

the first to a $D^{th}$ control channel resource groups are in ascending order of sequence numbers or priorities or the first to a $D^{th}$ control channel resource groups are in descending order of sequence numbers or priorities; and the first to a $C^{th}$ first unlicensed bands are in ascending order of frequencies or sequence numbers, the first to a $C^{th}$ first unlicensed bands are in descending order of frequencies or sequence numbers, the first to a $C^{th}$ first unlicensed bands are in order from an unlicensed band corresponding to a most significant bit in the bitmap to an unlicensed band corresponding to a least significant bit in the bitmap, or the first to a $C^{th}$ first unlicensed bands are in order from an unlicensed band corresponding to a least significant bit in the bitmap to an unlicensed band corresponding to a most significant bit in the bitmap.

17. The wireless communications apparatus according to claim 13, wherein:

the transceiver is configured to send third indication information to a terminal device, wherein the third indication information is used to indicate at least one offset m, and m is a natural number, wherein:

the determined C first unlicensed bands comprise an $((m+1) \bmod B)^{th}$ unlicensed band in the available unlicensed band set; and the $((m \bmod B)+1)^{th}$ unlicensed band is an $((m \bmod B)+1)^{th}$ unlicensed band in the B unlicensed bands in ascending order of frequencies or sequence numbers or the $((m \bmod B)+1)^{th}$ unlicensed band is an $((m \bmod B)+1)^{th}$ unlicensed band in the B unlicensed bands in descending order of frequencies or sequence numbers.

18. The wireless communications apparatus according to claim 17, wherein:

when D<B, the determined C first unlicensed bands comprise D unlicensed bands in the available unlicensed band set, or when D≥B, the determined C first unlicensed bands comprise the B unlicensed bands in the available unlicensed band set;

a $j^{th}$ control channel resource group belongs to a $(((j+m-1) \bmod B)+1)^{th}$ available unlicensed band, and $1 \leq j \leq D$; and the first to a $D^{th}$ control channel resource groups are in ascending order of sequence numbers or priorities or the first to a $D^{th}$ control channel resource groups are in descending order of sequence numbers or priorities.

* * * * *

UNITED STATES PATENT AND TRADEMARK OFFICE
CERTIFICATE OF CORRECTION

PATENT NO. : 11,665,736 B2
APPLICATION NO. : 17/013329
DATED : May 30, 2023
INVENTOR(S) : Zheng et al.

Page 1 of 1

It is certified that error appears in the above-identified patent and that said Letters Patent is hereby corrected as shown below:

In the Claims

Claim 1: Column 42, Line 1: "an it$^{th}$ control channel resource group belongs to an i$^{th}$ first" should read -- an i$^{th}$ control channel resource group belongs to an i$^{th}$ first --.

Claim 5: Column 43, Line 8: "the ((m mod B)+ 1)t$^{th}$ unlicensed band is an ((m mod" should read -- the ((m mod B)+ 1)$^{th}$ unlicensed band is an ((m mod --.

Signed and Sealed this
Nineteenth Day of September, 2023

*Katherine Kelly Vidal*
*Director of the United States Patent and Trademark Office*